(12) United States Patent
Pitigoi-Aron

(10) Patent No.: US 9,996,483 B2
(45) Date of Patent: Jun. 12, 2018

(54) N-BASE NUMBERS TO PHYSICAL WIRE STATES SYMBOLS TRANSLATION METHOD

(71) Applicant: QUALCOMM Incorporated, San Diego, CA (US)

(72) Inventor: Radu Pitigoi-Aron, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 15/092,554

(22) Filed: Apr. 6, 2016

(65) Prior Publication Data

US 2016/0299855 A1 Oct. 13, 2016

Related U.S. Application Data

(60) Provisional application No. 62/145,693, filed on Apr. 10, 2015.

(51) Int. Cl.
| | |
|---|---|
| *G06F 3/00* | (2006.01) |
| *G06F 13/10* | (2006.01) |
| *G06F 13/38* | (2006.01) |
| *G06F 13/42* | (2006.01) |
| *G06F 13/20* | (2006.01) |
| *G06F 13/40* | (2006.01) |

(52) U.S. Cl.
CPC ............ *G06F 13/102* (2013.01); *G06F 13/20* (2013.01); *G06F 13/385* (2013.01); *G06F 13/4068* (2013.01); *G06F 13/4295* (2013.01)

(58) Field of Classification Search
CPC .. G06F 13/385; G06F 13/4295; G06F 13/102; G06F 13/20; G06F 13/4068

USPC .......................................................... 710/8
See application file for complete search history.

(56) References Cited

U.S. PATENT DOCUMENTS

| | | |
|---|---|---|
| 2014/0270026 A1 | 9/2014 | Sengoku et al. |
| 2014/0286466 A1 | 9/2014 | Sengoku et al. |
| 2014/0372642 A1* | 12/2014 | Sengoku ............. G06F 13/4291 710/105 |

OTHER PUBLICATIONS

International Search Report and Written Opinion—PCT/US2016/026537—ISA/EPO—dated Jul. 18, 2016.

* cited by examiner

*Primary Examiner* — Chun Kuan Lee
(74) *Attorney, Agent, or Firm* — Loza & Loza LLP

(57) ABSTRACT

System, methods and apparatus are described that facilitate a device to encode/decode data in a data communications interface coupled to a plurality of wires. The device determines a value of a sequence of data bits allocated to a frame, converts the value into a sequence of symbols associated with the frame, and transmits the sequence of symbols to a receiver. The device performs the converting by calculating base-N coefficients of a base-N number polynomial for the frame based on the value, where N is greater than 2, calculating base-2 coefficients of a base-2 number polynomial for each symbol according to a respective base-N coefficient corresponding to each symbol, determining changes of states of the plurality of wires for each symbol according to the base-2 coefficients respectively calculated for each symbol, and generating the sequence of symbols based on the changes of states of the plurality of wires for each symbol.

30 Claims, 15 Drawing Sheets

900

| 3-bit value | Ternary coefficients {1st symbol, 2nd symbol} | 1st symbol based on formula: {XNOR (W1, prev-W1), XNOR (W2, prev-W2)} | 2nd symbol based on formula: {XNOR (W1, prev-W1), XNOR (W2, prev-W2)} |
|---|---|---|---|
| {0, 0, 0} = 0 | $0 = 0 \times 3^1 + 0 \times 3^0$ → {0, 0} | $0 = \underline{0} \times 2^1 + 0 \times 2^0$ → {0, 0} → {XNOR (W1, prev-W1) = $\underline{0}$, XNOR (W2, prev-W2) = 0} | $0 = \underline{0} \times 2^1 + 0 \times 2^0$ → {0, 0} → {XNOR (W1, prev-W1) = $\underline{0}$, XNOR (W2, prev-W2) = 0} |
| {0, 0, 1} = 1 | $1 = 0 \times 3^1 + 1 \times 3^0$ → {0, 1} | $0 = \underline{0} \times 2^1 + 0 \times 2^0$ → {0, 0} → {XNOR (W1, prev-W1) = $\underline{0}$, XNOR (W2, prev-W2) = 0} | $1 = \underline{0} \times 2^1 + 1 \times 2^0$ → {0, 1} → {XNOR (W1, prev-W1) = $\underline{0}$, XNOR (W2, prev-W2) = 1} |
| {0, 1, 0} = 2 | $2 = 0 \times 3^1 + 2 \times 3^0$ → {0, 2} | $0 = \underline{0} \times 2^1 + 0 \times 2^0$ → {0, 0} → {XNOR (W1, prev-W1) = $\underline{0}$, XNOR (W2, prev-W2) = 0} | $2 = \underline{1} \times 2^1 + 0 \times 2^0$ → {1, 0} → {XNOR (W1, prev-W1) = $\underline{1}$, XNOR (W2, prev-W2) = 0} |
| {0, 1, 1} = 3 | $3 = 1 \times 3^1 + 0 \times 3^0$ → {1, 0} | $1 = \underline{0} \times 2^1 + 1 \times 2^0$ → {0, 1} → {XNOR (W1, prev-W1) = $\underline{0}$, XNOR (W2, prev-W2) = 1} | $0 = \underline{0} \times 2^1 + 0 \times 2^0$ → {0, 0} → {XNOR (W1, prev-W1) = $\underline{0}$, XNOR (W2, prev-W2) = 0} |
| {1, 0, 0} = 4 | $4 = 1 \times 3^1 + 1 \times 3^0$ → {1, 1} | $1 = \underline{0} \times 2^1 + 1 \times 2^0$ → {0, 1} → {XNOR (W1, prev-W1) = $\underline{0}$, XNOR (W2, prev-W2) = 1} | $1 = \underline{0} \times 2^1 + 1 \times 2^0$ → {0, 1} → {XNOR (W1, prev-W1) = $\underline{0}$, XNOR (W2, prev-W2) = 1} |
| {1, 0, 1} = 5 | $5 = 1 \times 3^1 + 2 \times 3^0$ → {1, 2} | $1 = \underline{0} \times 2^1 + 1 \times 2^0$ → {0, 1} → {XNOR (W1, prev-W1) = $\underline{0}$, XNOR (W2, prev-W2) = 1} | $2 = \underline{1} \times 2^1 + 0 \times 2^0$ → {1, 0} → {XNOR (W1, prev-W1) = $\underline{1}$, XNOR (W2, prev-W2) = 0} |
| {1, 1, 0} = 6 | $6 = 2 \times 3^1 + 0 \times 3^0$ → {2, 0} | $2 = \underline{1} \times 2^1 + 0 \times 2^0$ → {1, 0} → {XNOR (W1, prev-W1) = $\underline{1}$, XNOR (W2, prev-W2) = 0} | $0 = \underline{0} \times 2^1 + 0 \times 2^0$ → {0, 0} → {XNOR (W1, prev-W1) = $\underline{0}$, XNOR (W2, prev-W2) = 0} |
| {1, 1, 1} = 7 | $7 = 2 \times 3^1 + 1 \times 3^0$ → {2, 1} | $2 = \underline{1} \times 2^1 + 0 \times 2^0$ → {1, 0} → {XNOR (W1, prev-W1) = $\underline{1}$, XNOR (W2, prev-W2) = 0} | $1 = \underline{0} \times 2^1 + 1 \times 2^0$ → {0, 1} → {XNOR (W1, prev-W1) = $\underline{0}$, XNOR (W2, prev-W2) = 1} |
| Special: 8 is an error | $8 = 2 \times 3^1 + 2 \times 3^0$ → {2, 2} | $2 = \underline{1} \times 2^1 + 0 \times 2^0$ → {1, 0} → {XNOR (W1, prev-W1) = $\underline{1}$, XNOR (W2, prev-W2) = 0} | $2 = \underline{1} \times 2^1 + 0 \times 2^0$ → {1, 0} → {XNOR (W1, prev-W1) = $\underline{1}$, XNOR (W2, prev-W2) = 0} |

Maximum number of symbols for N slots on M wires

| N \ M | 2 | 3 | 4 | 5 | 6 | 7 | 8 | 9 | 10 | 11 | 12 |
|---|---|---|---|---|---|---|---|---|---|---|---|
| 2 | 8 | 26 | 80 | 242 | 728 | 2186 | 6560 | 19682 | 59048 | 177146 | 531440 |
| 3 | 48 | 342 | 2400 | 16806 | 117648 | 823542 | 5764800 | 40353606 | 282475248 | 1977326742 | 13841287200 |
| 4 | 224 | 3374 | 50624 | 759374 | 11390624 | 170859374 | 2.563E+09 | 38443359374 | 5.7665E+11 | 8.64976E+12 | 1.29746E+14 |
| 5 | 960 | 29790 | 923520 | 2.9E+07 | 887503680 | 2.7513E+10 | 8.53E+11 | 2.644E+13 | 8.1963E+14 | 2.5408E+16 | 7.8766E+17 |
| 6 | 3968 | 250046 | 1.6E+07 | 9.9E+08 | 6.252E+10 | 3.939E+12 | 2.48E+14 | 1.5634E+16 | 9.8493E+17 | 6.2051E+19 | 3.9092E+21 |
| 7 | 16128 | 2048382 | 2.6E+08 | 3.3E+10 | 4.196E+12 | 5.3288E+14 | 6.77E+16 | 8.5948E+18 | 1.0915E+21 | 1.3862E+23 | 1.7605E+25 |
| 8 | 65024 | 1.7E+07 | 4.2E+09 | 1.1E+12 | 2.749E+14 | 7.011E+16 | 1.79E+19 | 4.5589E+21 | 1.1625E+24 | 2.9644E+26 | 7.5593E+28 |
| 9 | 261120 | 1.3E+08 | 6.8E+10 | 3.5E+13 | 1.78E+16 | 9.098E+18 | 4.65E+21 | 2.3757E+24 | 1.214E+27 | 6.2034E+29 | 3.1699E+32 |
| 10 | 1046528 | 1.1E+09 | 1.1E+12 | 1.1E+15 | 1.146E+18 | 1.1725E+21 | 1.2E+24 | 1.2271E+27 | 1.2553E+30 | 1.2842E+33 | 1.3137E+36 |
| 11 | 4190208 | 8.6E+09 | 1.8E+13 | 3.6E+16 | 7.357E+19 | 1.506E+23 | 3.08E+26 | 6.3105E+29 | 1.2917E+33 | 2.6442E+36 | 5.4127E+39 |
| 12 | 1.7E+07 | 6.9E+10 | 2.8E+14 | 1.2E+18 | 4.715E+21 | 1.931E+25 | 7.91E+28 | 3.2381E+32 | 1.326E+36 | 5.4299E+39 | 2.2235E+43 |

N-BASE NUMBERS TO PHYSICAL WIRE STATES SYMBOLS TRANSLATION METHOD

CROSS-REFERENCE TO RELATED APPLICATIONS

This application claims priority to and the benefit of U.S. Provisional Application Ser. No. 62/145,693, entitled "N-BASE NUMBERS TO PHYSICAL WIRE STATES SYMBOLS TRANSLATION METHOD" filed on Apr. 10, 2015, the entire content of which is incorporated herein by reference.

BACKGROUND

Field

The present disclosure relates generally to an interface between a host processor and a peripheral device and, more particularly, to encoding/decoding data based on wire state changes on an interface.

Background

Manufacturers of mobile devices, such as cellular phones, may obtain components of the mobile devices from various sources, including different manufacturers. For example, an application processor in a mobile computing device may be obtained from a first manufacturer, while sensors employed by the mobile computing device may be obtained from one or more other manufacturers. Various standards-based or proprietary interfaces have been defined, typically directed to a specific application or type of application. For example, cellular telephones may use a communications interface that is compatible with or conforms to an Inter-Integrated Circuit (I2C) standard, a Serial Peripheral Interface (SPI) standard, or an Improved Inter-Integrated Circuit (I3C) standard, for example.

Currently, there is a need for increasing data throughput while reducing energy consumption on various interfaces. An exemplary concept for such data transfer protocol is based on expressing binary streams of data as framed numbers in higher level numeral systems. Some example applications implementing such data transfer protocol include I3C, camera control interface extension (CCIe), and Sensors Global Bus (SGbus).

A fundamental feature of data transfer involves transferring symbols as coefficients of larger numeral bases (e.g., base 3, 7, 8, 10, 16, etc.). A particular area of interest relates to symbols of ternary numbers. Such numbers can be implemented using a two-wire bus interface, wherein each wire has two states. Previous methods to increase data throughput while reducing energy consumption on such interface involves evaluating a correlation between the wires' physical state transitions and a related symbol. For small numeral bases (e.g., base 3), such previous methods may be efficient. However, for larger numeral bases (e.g., base 7, 8, 10, 16, etc.), the previous methods may require a significantly larger correspondence table of valued coded bits, a subtraction block, and/or a supplementary translation table translating symbols to directly usable ternary coefficients. Such requirements may be prohibitive for devices where a cost factor is important. Accordingly, there is an ongoing need for increasing data throughput on an interface that allows for a direct reading of ternary or any other larger numeral base coefficients.

SUMMARY

Embodiments disclosed herein provide systems, methods and apparatus for encoding and/or encoding data based on wire state changes on a serial bus.

In an aspect of the disclosure, method of encoding data in a data communications interface includes receiving a binary string of data to be encoded, respectively allocating subsets of the binary string of data to a plurality of frames, determining a value of a sequence of data bits allocated to a frame, wherein the sequence of data bits is a subset of the binary string of data, converting the value into a sequence of symbols associated with the fame, and transmitting the sequence of symbols to a receiver. The converting includes calculating base-N coefficients of a base-N number polynomial for the frame based on the value, where N is an integer greater than 2, and where the base-N coefficients respectively correspond to symbols of the sequence of symbols, calculating base-2 coefficients of a base-2 number polynomial for each symbol of the sequence of symbols according to a respective base-N coefficient corresponding to each symbol, determining changes of states of the plurality of wires for each symbol of the sequence of symbols according to the base-2 coefficients respectively calculated for each symbol, and generating the sequence of symbols based on the changes of states of the plurality of wires for each symbol.

In an aspect, the converting the value into the sequence of symbols includes calculating a first pair of base-2 coefficients of a first base-2 number polynomial according to a first base-N coefficient corresponding to a first symbol of the sequence of symbols, determining the changes of states of the plurality of wires for the first symbol according to the first pair of base-2 coefficients, calculating a second pair of base-2 coefficients of a second base-2 number polynomial according to a second base-N coefficient corresponding to a second symbol of the sequence of symbols, and determining the changes of states of the plurality of wires for the second symbol according to the second pair of base-2 coefficients.

In another aspect, each of the first pair and second pair of base-2 coefficients includes a first value and a second value, the first value indicates a change in state or no change in state between a current state of a first wire and a previous state of the first wire, and the second value indicates a change in state or no change in state between a current state of a second wire and a previous state of the second wire. The first value represents an exclusive-NOR (XNOR) operation between the current state of the first wire and the previous state of the first wire. The second value represents an exclusive-NOR (XNOR) operation between the current state of the second wire and the previous state of the second wire.

When the first value is 0, a change in state between the current state of the first wire and the previous state of the first wire is indicated. When the first value is 1, no change in state between the current state of the first wire and the previous state of the first wire is indicated. When the second value is 0, a change in state between the current state of the second wire and the previous state of the second wire is indicated. When the second value is 1, no change in state between the current state of the second wire and the previous state of the second wire is indicated.

In a further aspect, the generating the sequence of symbols includes determining that the first wire is to be pulled down to a LOW level when the change in state between the current state of the first wire and the previous state of the first wire is indicated for the first symbol, pulling down the first wire to the LOW level when no change in state between the current state of the first wire and the previous state of the first wire is indicated for the second symbol, refraining from pulling down the first wire to the LOW level when the change in state between the current state of the first wire and the previous state of the first wire is indicated for the second symbol.

In another aspect of the disclosure, an apparatus for encoding data in a data communications interface includes a communication interface circuit coupled to a plurality of wires and a processing circuit coupled to the communication interface circuit. The processing circuit is configured to receive a binary string of data to be encoded, respectively allocate subsets of the binary string of data to a plurality of frames, determine a value of a sequence of data bits allocated to a frame, wherein the sequence of data bits is a subset of the binary string of data, convert the value into a sequence of symbols associated with the frame, and transmit the sequence of symbols to a receiver. The processing circuit is configured to convert by calculating base-N coefficients of a base-N number polynomial for the frame based on the value, where N is an integer greater than 2, and where the base-N coefficients respectively correspond to symbols of the sequence of symbols, calculating base-2 coefficients of a base-2 number polynomial for each symbol of the sequence of symbols according to a respective base-N coefficient corresponding to each symbol, determining changes of states of the plurality of wires for each symbol of the sequence of symbols according to the base-2 coefficients respectively calculated for each symbol and generating the sequence of symbols based on the changes of states of the plurality of wires for each symbol.

In a further aspect of the disclosure, an apparatus for encoding data in a data communications interface coupled to a plurality of wires includes means for receiving a binary string of data to be encoded, means for respectively allocating subsets of the binary string of data to a plurality of frames, means for determining a value of a sequence of data bits allocated to a frame, wherein the sequence of data bits is a subset of the binary string of data, means for converting the value into a sequence of symbols associated with the frame, and means for transmitting the sequence of symbols to a receiver. The means for converting is configured to convert by calculating base-N coefficients of a base-N number polynomial for the frame based on the value, where N is an integer greater than 2, and where the base-N coefficients respectively correspond to symbols of the sequence of symbols, calculating base-2 coefficients of a base-2 number polynomial for each symbol of the sequence of symbols according to a respective base-N coefficient corresponding to each symbol, determining changes of states of the plurality of wires for each symbol of the sequence of symbols according to the base-2 coefficients respectively calculated for each symbol, and generating the sequence of symbols based on the changes of states of the plurality of wires for each symbol.

In an aspect of the disclosure, a processor-readable storage medium having one or more instructions which, when executed by a processing circuit of an encoder, cause the processing circuit to receive a binary string of data to be encoded, respectively allocate subsets of the binary string of data to a plurality of frames, determine a value of a sequence of data bits allocated to a frame, wherein the sequence of data bits is a subset of the binary string of data, convert the value into a sequence of symbols associated with the frame, and transmit the sequence of symbols to a receiver. The instructions further cause the processing circuit to convert by calculating base-N coefficients of a base-N number polynomial for the frame based on the value, where N is an integer greater than 2, and where the base-N coefficients respectively correspond to symbols of the sequence of symbols, calculating base-2 coefficients of a base-2 number polynomial for each symbol of the sequence of symbols according to a respective base-N coefficient corresponding to each symbol, determining changes of states of the plurality of wires for each symbol of the sequence of symbols according to the base-2 coefficients respectively calculated for each symbol, and generating the sequence of symbols based on the changes of states of the plurality of wires for each symbol In another aspect of the disclosure, a method of decoding data in a data communications interface coupled to a plurality of wires includes receiving a sequence of symbols in a frame, the sequence of symbols representing a sequence of data bits allocated to the frame, converting the sequence of symbols into a value of the sequence of data bits, and recovering the sequence of data bits by expressing the value in a binary format. In a aspect, the sequence of data bits is a subset of a binary string of data to be decoded, wherein subsets of the binary string are respectively allocated to a plurality of frames. The converting includes evaluating changes of states of the plurality of wires based on the sequence of symbols, calculating symbol values for the sequence of symbols based on the changes of states, wherein the symbol values respectively correspond to base-N coefficients of a base-N number polynomial, where N is an integer greater than 2, and calculating a result of the base-N number polynomial according to the base-N coefficients to determine the value of the sequence of data bits.

In an aspect, each symbol of the sequence of symbols includes current states of the plurality of wires. The evaluating the changes of states of the plurality of wires includes performing for each symbol an exclusive-NOR (XNOR) operation between a current state of a first wire and a previous state of the first wire to determine a first state value, and an exclusive-NOR (XNOR) operation between a current state of a second wire and a previous state of the second wire to determine a second state value.

The evaluating may further include determining that the first state value is 0 when a change in state occurs between the current state of the first wire and the previous state of the first wire, determining that the first state value is 1 when no change in state occurs between the current state of the first wire and the previous state of the first wire, determining that the second state value is 0 when a change in state occurs between the current state of the second wire and the previous state of the second wire, and determining that the second state value is 1 when no change in state occurs between the current state of the second wire and the previous state of the second wire.

In an aspect, the first state value and the second state value of a symbol correspond to a pair of base-2 coefficients of a base-2 number polynomial corresponding to the symbol. Accordingly, the calculating the symbol values of the sequence of symbols includes calculating a result of the base-2 number polynomial of each symbol of the sequence of symbols according to a respective pair of base-2 coefficients corresponding to each symbol, and determining a symbol value for each symbol according to the result of the base-2 number polynomial respectively calculated for each symbol.

In a further aspect of the disclosure, an apparatus for decoding data in a data communications interface includes a communication interface circuit coupled to a plurality of wires and a processing circuit coupled to the communication interface circuit. The processing circuit is configured to receive a sequence of symbols in a frame, the sequence of symbols representing a sequence of data bits allocated to the frame, convert the sequence of symbols into a value of the sequence of data bits, and recover the sequence of data bits by expressing the value in a binary format. In an aspect, the sequence of data bits is a subset of a binary string of data to be decoded, wherein subsets of the binary siring are respectively allocated to a plurality of frames. The processing circuit is configured to convert by evaluating changes of states of the plurality of wires based on the sequence of symbols, calculating symbol values for the sequence of symbols based on the changes of states, wherein the symbol values respectively correspond to base-N coefficients of a base-N number polynomial, where N is an integer greater than 2, and calculating a result of the base-N number polynomial according to the base-N coefficients to determine the value of the sequence of data bits.

In another aspect of the disclosure, an apparatus for decoding data in a data communications interface coupled to a plurality of wires includes means for receiving a sequence of symbols in a frame, the sequence of symbols representing a sequence of data bits allocated to the frame, means for converting the sequence of symbols into a value of the sequence of data bits, and means for recovering the sequence of data bits by expressing the value in a binary format. In an aspect, the sequence of data bits is a subset of a binary string of data to be decoded, wherein subsets of the binary string are respectively allocated to a plurality of frames. The means for converting is configured to convert by evaluating changes of states of the plurality of wires based on the sequence of symbols, calculating symbol values for the sequence of symbols based on the changes of states, wherein the symbol values respectively correspond to base-N coefficients of a base-N number polynomial, where N is an integer greater than 2, and calculating a result of the base-N number polynomial according to the base-N coefficients to determine the value of the sequence of data bits.

In an aspect of the disclosure, a processor-readable storage medium having one or more instructions which, when executed by a processing circuit of a decoder, cause the processing circuit to receive a sequence of symbols in a frame, the sequence of symbols representing a sequence of data bits allocated to the frame, convert the sequence of symbols into a value of the sequence of data bits, and recover the sequence of data bits by expressing the value in a binary format. In an aspect, the sequence of data bits is a subset of a binary string of data to be decoded, wherein subsets of the binary string are respectively allocated to a plurality of frames. The instructions cause the processing circuit to convert by evaluating changes of states of the plurality of wires based on the sequence of symbols, calculating symbol values for the sequence of symbols based on the changes of states, wherein the symbol values respectively correspond to base-N coefficients of a base-N number polynomial, where N is an integer greater than 2, and calculating a result of the base-N number polynomial according to the base-N coefficients to determine the value of the sequence of data bits.

BRIEF DESCRIPTION OF THE DRAWINGS

FIG. 9 illustrates a table resulting from an encoding/decoding scheme according to certain aspects disclosed herein.

FIG. 11 illustrates a table of a number of symbols that would be available for various combinations of a number of basic data transfer links (wires) and a number of slots of a frame.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Overview

The present disclosure provides for increasing data throughput on an interface using a physical coding that allows for a direct reading of ternary or any other larger numeral base coefficients corresponding to a symbol based data transfer. The present disclosure may use basic gates for deriving the ternary (or larger numeral base) coefficients. For the least complex symbol based data transfer, namely on base 3 (ternary) numbers, the present disclosure allows for ease of coding and decoding. For larger numeral bases, e.g., base 7 (septenary) or base 15 (pentadecimal) numbers, implemented on 3 wires or 4 wires, respectively, the present disclosure allows for ease of coding and decoding as well as reduces the number of gates required for implementation. The present disclosure also provides benefits for practical systems (e.g., Improved Inter-Integrated Circuit (I3C)) where it is necessary to ensure backwards compatibility with previously used interfaces of different types.

Exemplary Operating Environment

Figure 1:
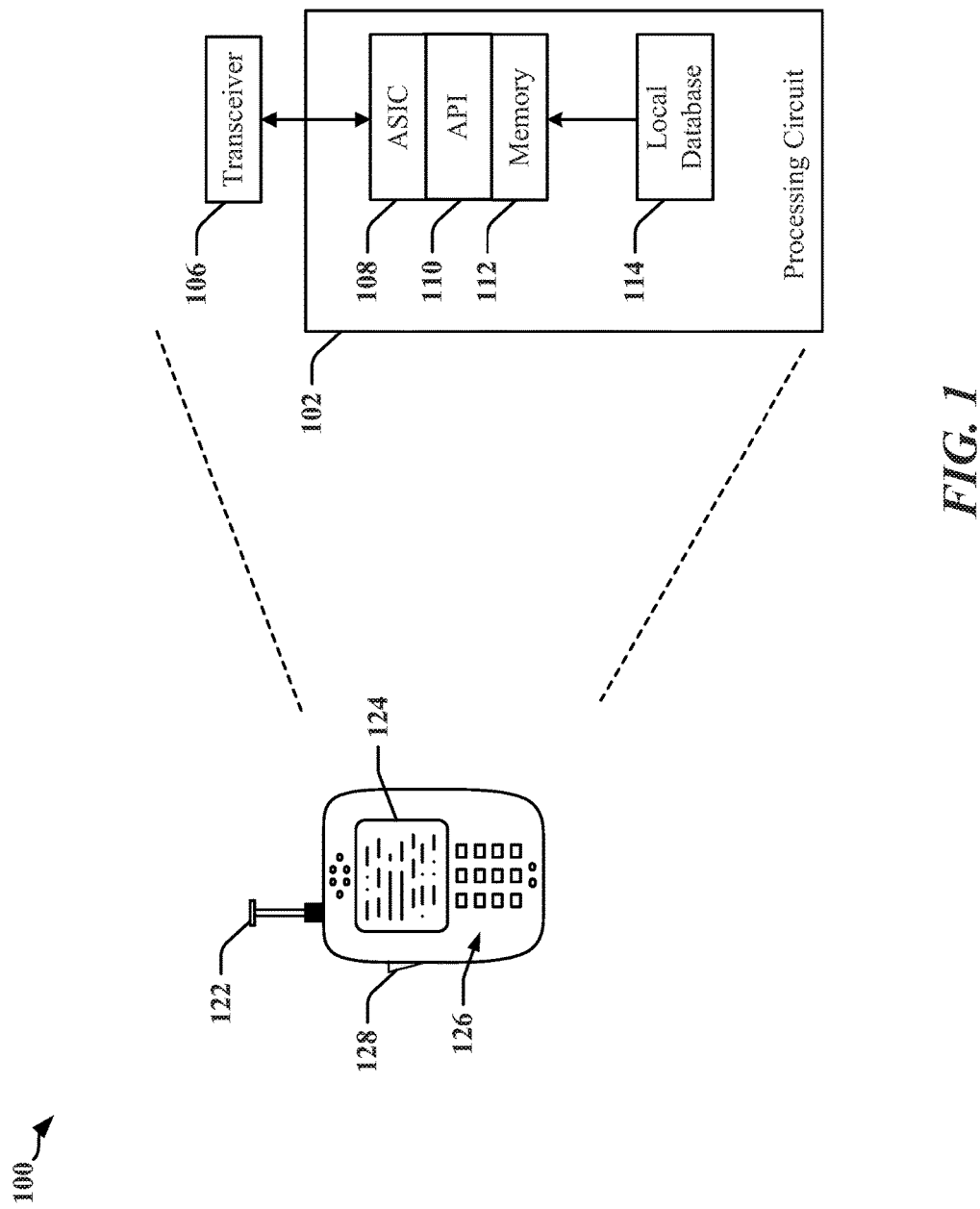
FIG. 1 depicts an apparatus employing a data link between IC devices that selectively operates according to one of a plurality of available standards.

Certain aspects of the disclosure may be applicable to communications links deployed between electronic devices that may include subcomponents of an apparatus such as a telephone, a mobile computing device, an appliance, automobile electronics, avionics systems, etc. FIG. 1 depicts an apparatus that may employ a communication link between IC devices. In one example, the apparatus 100 may include a wireless communication device that communicates through an RF transceiver with a radio access network (RAN), a core access network, the Internet and/or another network. The apparatus 100 may include a communications transceiver 106 operably coupled to processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as a memory 112 that may maintain instructions and data that may be executed by processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate apparatus 100. The local database 114 may be implemented using one or more of a database module, flash memory, magnetic media, EEPROM, optical media, tape, soft or hard disk, or the like. The processing circuit may also be operably coupled to external devices such as antenna 122, display 124, operator controls, such as button 128 and keypad 126 among other components.

Figure 2:
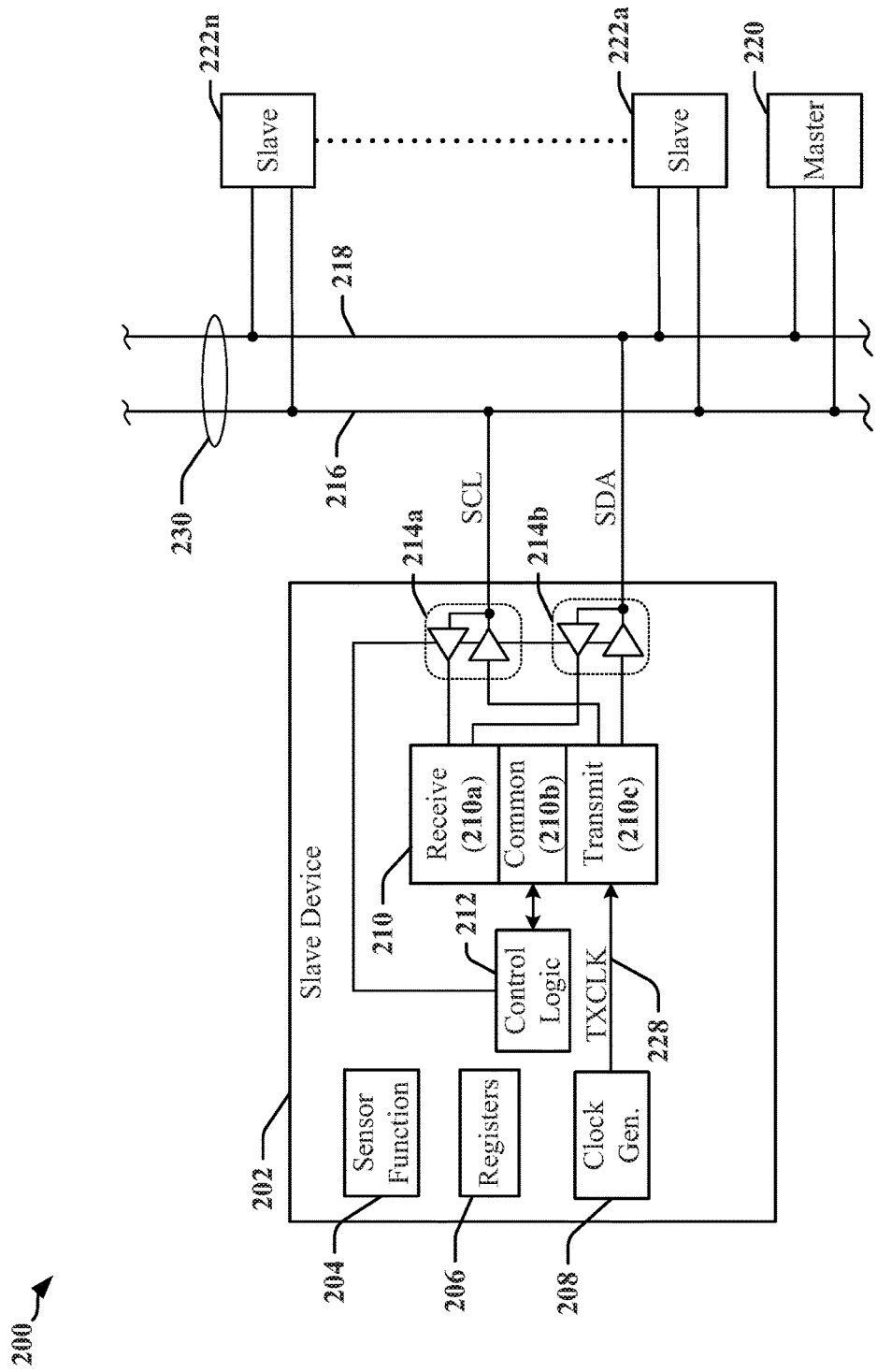
FIG. 2 illustrates a system architecture for an apparatus employing a data link between IC devices.

FIG. 2 is a block schematic illustrating certain aspects of an apparatus 200 connected to a communications bus, where the apparatus may be embodied in one or more of a wireless mobile device, a mobile telephone, a mobile computing system, a wireless telephone, a notebook computer, a tablet computing device, a media player, a gaming device, a personal digital assistants (PDA) or other handheld device, a netbook, a notebook computer, a television, an entertainment device, a wearable device, or the like. The apparatus 200 may include multiple devices 202, 220 and 222a-22n, which communicate using a bus 230. As shown in FIG. 2, the bus 230 may include a Serial Clock line (SCL) 216 and a Serial Data line (SDA) 218. However, according to aspects of the disclosure, the bus 230 may include more than two lines/wires (e.g., 3 or 4 wires) for transmitting a signal. The bus 230 can extend the capabilities of a conventional bus for devices that are configured for enhanced features supported by the bus 230. For example, the bus 230 may support a higher bit rate than an I2C, SPI, or Universal Asynchronous Receiver/Transmitter (UART) bus, for example.

In the example illustrated in FIG. 2, a device 202 may be configured to operate as a slave on the bus 230. The device 202 may be configured to, or adapted to, provide a sensor control function 204 that manages one or more generic sensors, high speed sensors, fingerprint sensors, image sensors (e.g. cameras), touchscreen sensors, and so on. In addition, the device 202 may include configuration registers or other storage 206, control logic 212, a transceiver 210 and line drivers/receivers 214a and 214b. The control logic 212 may include a processing circuit such as a state machine, sequencer, signal processor or general-purpose processor.

The transceiver 210 may include a receiver 210a, a transmitter 210c and common circuits 210b, including timing, logic and storage circuits and/or devices. In one example, the transmitter 210c encodes and transmits data based on timing provided by a clock generation circuit 208.

According to certain aspects disclosed herein, information between entities is transferred via a convention established between the respective partners. The convention may be embodied in various ways, e.g., spoken/written languages, computer languages, and/or data. In all of these systems, symbols are present to which some meaning is attached. A method for data transfer involves the binary expression of physical states of some medium. The method uses two symbols, generally "0" and "1". Data can be transferred by using higher numerical levels, e.g., octal, decimal, and hexadecimal, etc. All numerical systems use symbols, wherein the higher the numerical base, the more different symbols are necessary and less positions are required on the stream of data.

Data streams can be expressed as a succession of numbers. The numbers are a polynomial of a numeral base at integer powers, listed in order. As such, any data stream can be written in the general form as:

$$\text{DATA} = \sum_{i=0}^{mnumeralbase} S_i NB^i$$

where:
DATA=total value of data string
NB=numeral base, e.g., 2, 3, 8, 10, or 16
S=symbol, e.g., 0, 1, . . . , A, B, C, . . .

In one example, in order to transfer data a binary string of information may be transformed into an equal numerical value, coded as a base 3 (ternary) number. As such, fewer characters need to be transmitted between the nodes for the same information. The transformed ternary numbers are a polynomial sum, where the factors are the power of 3 and the coefficients are [0, 1, 2].

$$\sum_{i=0}^{mbinary} B_i 2^i = \sum_{k=0}^{mternary} T_k 3^k$$

where: $T_k$=ternary coefficients, $\in[0, 1, 2]$.
In another example, the same data can be encoded in various numeral systems, as follows:

$$\text{DATA} = \sum_{i=0}^{mbinary} B_i 2^i = \sum_{i=0}^{mternary} T_i 3^i = \sum_{i=0}^{mdecimal} D_i 10^i = \sum_{i=0}^{mhexa} H_i 16^i$$

Figure 3:
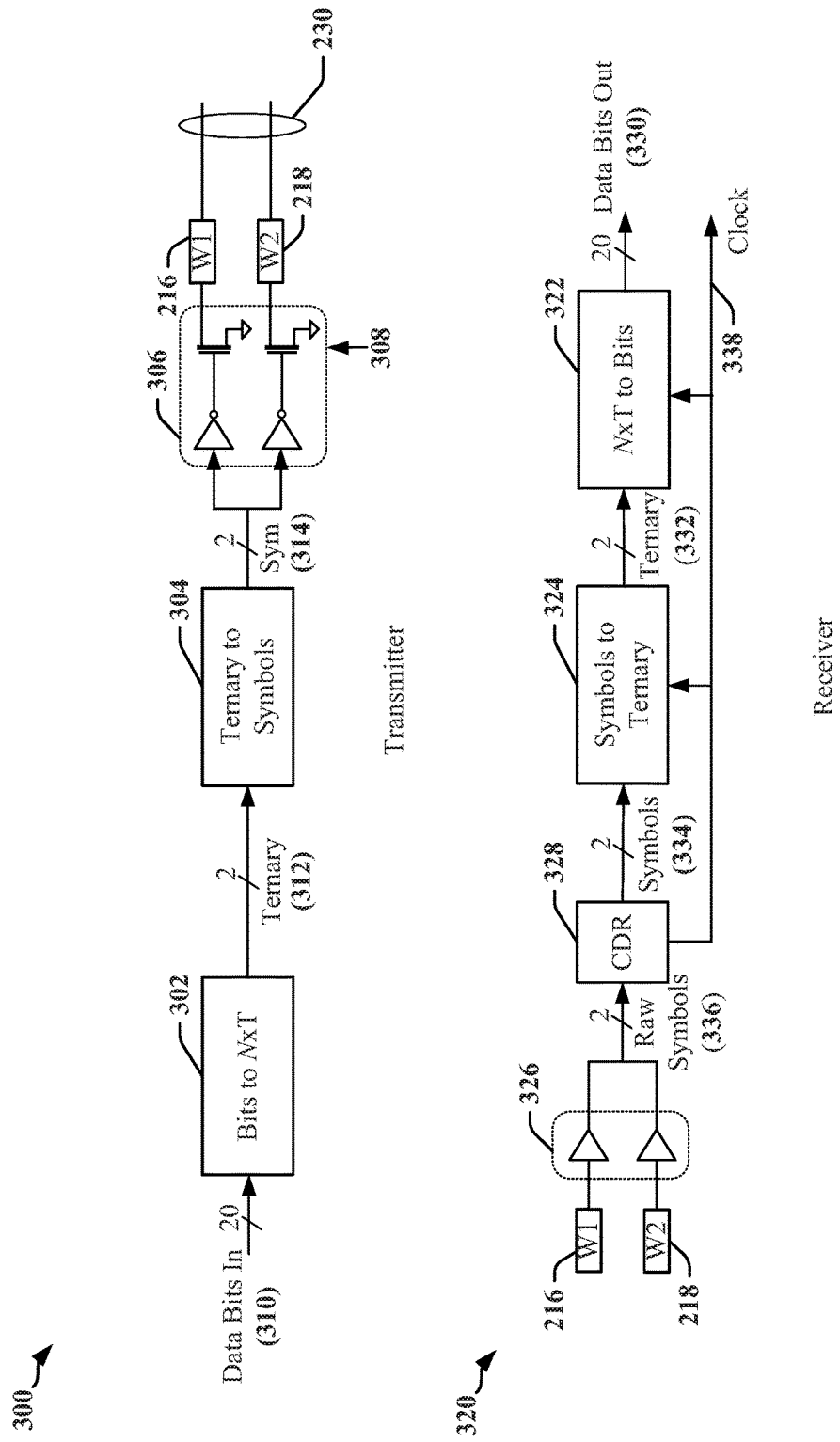
FIG. 3 illustrates certain aspects of a transmitter and a receiver according to certain aspects disclosed herein.

An example for encoding a two-byte (i.e., 16-bit) exemplary number in various numeral bases is presented below:
Same data, coded in various numeral bases:
Binary: 1111 0000 1111 0000⇔16 symbol slots, 2 different symbols
Ternary: 1001021110⇔11 symbol slots, 3 different symbols
Decimal: 61680⇔5 symbol slots, 10 different symbols
Hex: F0F0⇔4 symbol slots, 16 different symbols
FIG. 3 is a block diagram illustrating an example of a transmitter 300 and a receiver 320 configured according to certain aspects disclosed herein. For bus operations, the transmitter 300 may transcode data 310 into larger numeral base (e.g., base 3, 7, 8, 10, 16, etc.) numbers. As shown in FIG. 3, the transmitter 300 may transcode the data 310 into ternary (base 3) numbers that are encoded as symbols transmitted on a first signal wire W1 (e.g., Serial Clock line (SCL)) 216 and a second signal wire (e.g., Serial Data line (SDA)) 218. However, according to aspects of the disclosure, the transmitter 300 may transcode the data into any numbers with a numeral base larger than 3, wherein the numbers are encoded as symbols transmitted on more than two signal wires. In the example depicted, each data element (also referred to as a data word) of the input data 310 may have a predefined number of bits, such as 8, 12, 16, 19, or 20 bits. A transcoder 302 may receive the input data 310 and produce a sequence of ternary numbers 312 for each data element. The ternary numbers 312 may be encoded in two bits and there may be 12 ternary numbers in each ternary sequence 312. An encoder 304 produces a stream of 2-bit symbols 314 that are transmitted through line drivers 306. In the example depicted, the line drivers 306 include open-drain output transistors 308. However, in other examples, the line drivers 306 may drive the W1 216 and W2 218 signal wires using push-pull drivers. The output stream of 2-bit symbols 314 generated by the encoder has a transition in the state of at least one of the W1 216 and W2 218 signal wires between consecutive symbols 314 by ensuring that no pair of consecutive symbols includes two identical symbols. The availability of a transition of state in at least one wire 216 and/or 218 permits a receiving circuit 320 to extract a receive clock 338 from the stream of data symbols 314.

In a bus interface, the receiver 320 may include or cooperate with a clock and data recovery (CDR) circuit 328. The receiver 320 may include line interface circuits 326 that provide a stream of raw 2-bit symbols 336 from the W1 216 and/or W2 218 signal wires to the CDR 328. The CDR 328 extracts a receive clock 338 from the raw symbols 336 and provides a stream of 2-bit symbols 334 and the receive clock 338 to other circuits 324 and 322 of the receiver 320. In some examples, the CDR 328 may produce multiple clocks 338. A decoder 324 may use the receive clock 338 to decode the stream of symbols 334 into sequences of 12 ternary numbers 332. The ternary numbers 332 may be encoded using two bits. A transcoder 322 may then convert each sequence of 12 ternary numbers 332 into 8, 12, 16, 19, or 20 bit output data elements 330. In an aspect, the ternary numbers may be framed in any number of slots. For example, a 3-bit number may be framed in two ternary slots, an 8-bit number may be framed in six ternary slots, and a 19-bit number may be framed in 12 ternary slots. For a higher numeral base number, e.g., a base-7 number (i.e., septenary) using three wires, a frame of two septenary slots can deliver decimal 48, which covers decimal 31, which is five bits of output data ($2^5-1$).

According to other aspects of the disclosure, the receiver 320 may provide a stream of raw symbols correlating to numbers with a numeral base larger than 3 to the CDR 328. The CDR 328 may then extract a receive clock from such raw symbols and provide a stream of symbols and the receive clock to the decoder 324 and the transcoder 322. The decoder 324 may use the receive clock to decode hie stream of symbols into sequences of numbers having the numeral base larger than 3. The transcoder 322 may then convert each sequence of numbers into output data elements having a corresponding number of bits.

Figure 4:
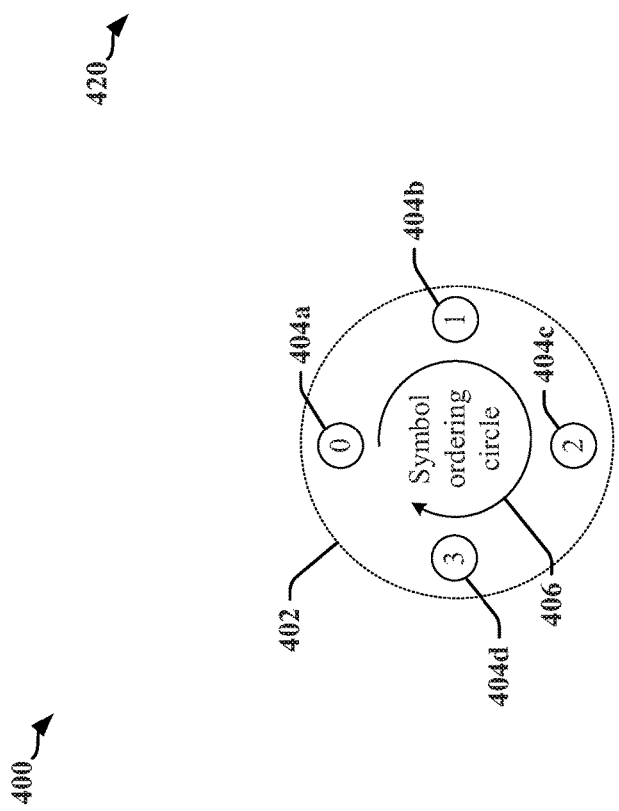
FIG. 4 illustrates an encoding scheme for transcoding data according to certain aspects disclosed herein.

FIG. 4 is a drawing illustrating an encoding scheme 400 that may be used by the encoder 304 to produce a sequence of symbols 314 with an embedded clock for transmission on the bus 230. The encoding scheme 400 may also be used by a decoder 324 to extract ternary transition numbers from symbols received from the bus 230. In the encoding scheme 400, the two wires of the bus 230 permit definition of 4 basic symbols S: {0, 1, 2, 3}. Any two consecutive symbols in the sequence of symbols 314, 334 have different states, and the symbol sequences 0,0, 1,1, 2,2 and 3,3 are invalid combinations of consecutive symbols. Accordingly, only three valid symbol transitions are available at each symbol boundary, where the symbol boundary is determined by the transmit clock and represents the point at which a first symbol (previous symbol Ps) 422 terminates and a second symbol (current symbol Cs) 424 begins.

According to certain aspects disclosed herein, the three available transitions are assigned a transition number (T) 426 for each Ps symbol 422. The value of T 426 can be represented by a ternary number. In one example, die value of transition number 426 is determined by assigning a symbol-ordering circle 402 for the encoding scheme. The symbol-ordering circle 402 allocates locations 404a-404d on the circle 402 for the four possible symbols, and a direction of rotation 406 between the locations 404a-404d. In the depicted example, the direction of rotation 406 is clockwise. The transition number 426 may represent the separation between the valid current symbols 424 and the immediately preceding symbol 422. Separation may be defined as the number of steps along the direction of rotation 406 on the symbol-ordering circle 402 required to reach the current symbol Cs 424 from the previous symbol 422. The number of steps can be expressed as a single digit base-3 number. It will be appreciated that a three-step difference between symbols can be represented as a $0_{base-3}$. The Table 420 in FIG. 4 summarizes an encoding scheme employing this approach.

At the transmitter 300, the Table 420 may be used to lookup a current symbol 424 to be transmitted, given knowledge of the previously generated symbol 422 and an input ternary number, which is used as a transition number 426. At the receiver 320, the Table 420 may be used as a lookup to determine a transition number 426 that represents the transition between the previously received symbol 422 and the currently received symbol 424. The transition number 426 may be output as a ternary number.

Figure 5:
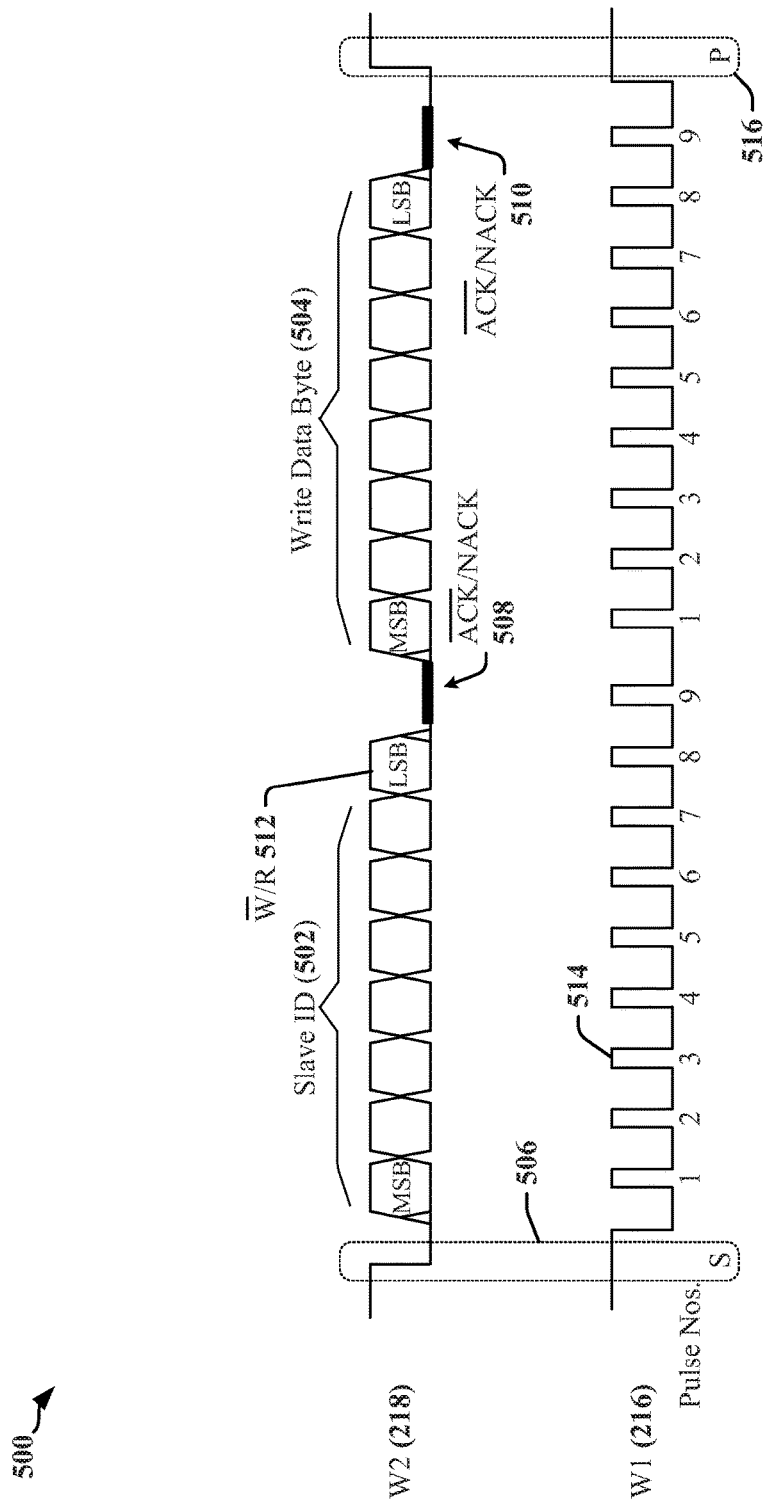
FIG. 5 illustrates a timing diagram of an I2C one byte write data operation.

FIG. 5 is a timing diagram 500 illustrating an I2C one byte write data operation. A transmission is initiated when a master node provides a START condition 506 by driving the W2 line (e.g., SDA line) 218 low while the W1 line (e.g., SCL) 216 remains high. An I2C master node sends a 7-bit slave ID 502 on the SDA line 218 to indicate which slave node on the I2C bus the master node wishes to access, followed by a Read/Write bit 512 that indicates whether the operation is a read or a write operation, whereby the Read/Write bit 512 is at logic 0 to indicate a write operation and at logic 1 to indicate a read operation. Only the slave node whose ID matches with the 7-bit slave ID 502 can respond to the write (or other) operation. In order for an I2C slave node to detect its own ID 502, the master node transmits at least 8-bits on the SDA line 218, together with 8 clock pulses on the SCL line 216. The master node provides a STOP condition 516 to terminate the transaction by driving the SDA line 218 high while the SCL line 216 remains high. The I2C interface is considered to be in a "Bus-Busy" state after a START condition 506 and in a "Bus-Free" state after a STOP condition 516.

Bus communications may use the combination of the SCL line 216 and the SDA line 218 of an I2C bus for data transmission. A bus symbol may be transmitted at a time corresponding to each toggle of a clock signal pulse 514 transmitted on the SCL line 216 for an I2C transmission. The number of clock toggles transmitted in each frame transmission period may therefore define the number of symbols that may be transmitted for each bus transmission. Accordingly, 12 symbol transmissions may be provided in the 12 signaling states available during a 6-SCL pulse sequence.

The SCL line 216 and/or the SDA line 218 of an I2C bus may be utilized for data transmission when a clock signal has been embedded within symbol transitions. Consequently, the SDA line 218 and SCL line 216 can be used to transmit symbols without affecting legacy I2C slave node functionality and without using a bridge device to segregate legacy I2C slave nodes from other bus-capable nodes. In I2C mode, a START condition 506 may be provided only by an I2C master. In another aspect, a START condition 506 is provided by whichever node is going to transmit a 12-symbol word.

Figure 6:
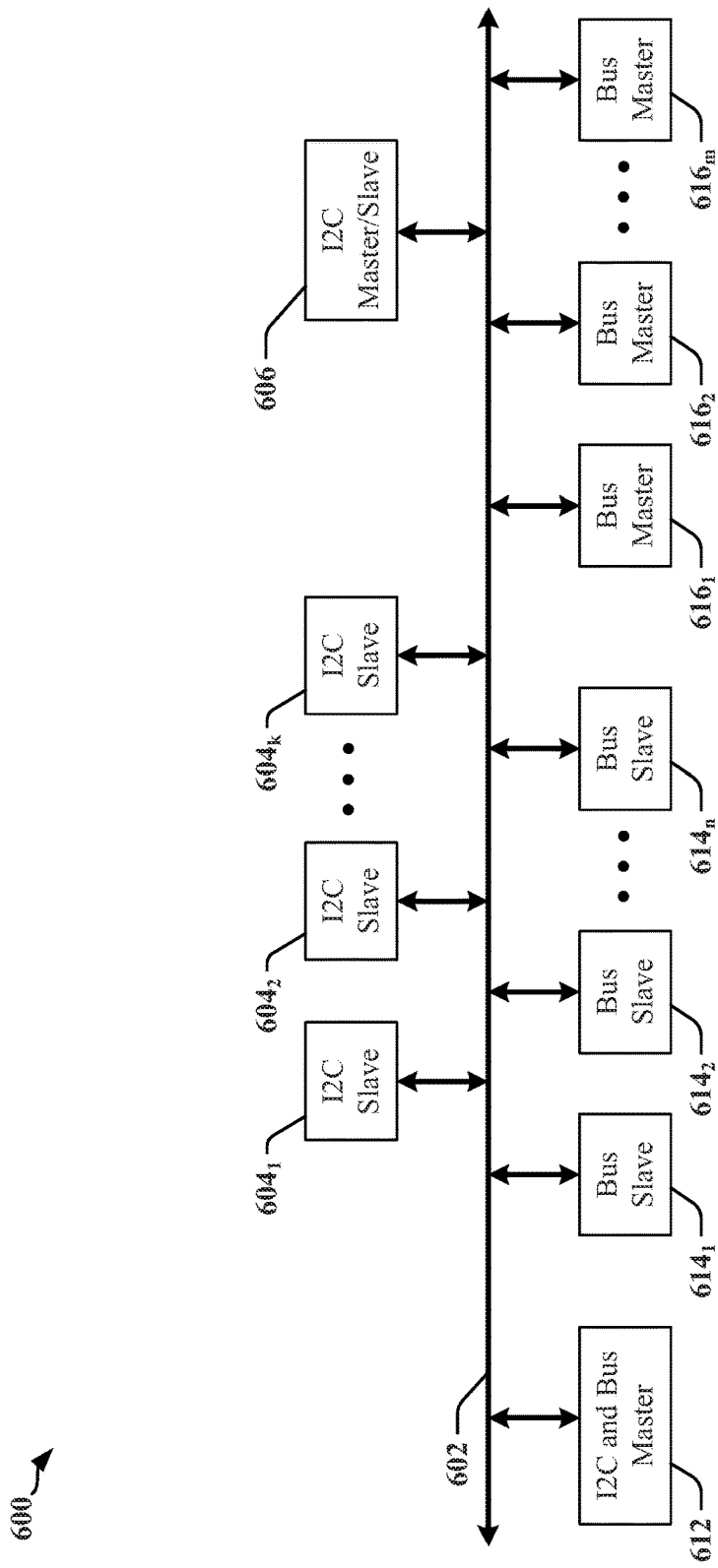
FIG. 6 illustrates a configuration of I2C devices and other devices connected to a common I2C bus.

FIG. 6 illustrates a configuration in which a common (or shared) bus 602 couples I2C devices 604$_i$-604$_k$, 606 and other bus devices 612, 614$_i$-614$_n$ and 616$_i$-616$_m$. The other bus devices 612, 614$_i$-614$_n$ and 616$_i$-616$_m$ may coexist with conventionally configured I2C devices 604$_i$-604$_k$, 606, and certain of the other bus devices 612, 614$_i$-614$_n$ and 616$_i$-616$_m$ may communicate using conventional I2C protocols, as desired or needed.

Data transfer on the common bus 602, including configuration and other bus control messages, may be initiated and performed using modified versions of an I2C protocol or a variant of the I2C protocol. In one example, all transactions may be initiated using conventional I2C protocols to start the transaction.

According to certain aspects disclosed herein, communications on the common bus 602 may be effectively containerized such that data transfers between devices coupled to the common bus 602 are encapsulated in transactions (containers) that occur between bus management and/or control commands. Typically, devices that are configured to communicate using the protocol employed by devices engaged in a current transaction may ignore or be oblivious to the transaction.

Figure 7:
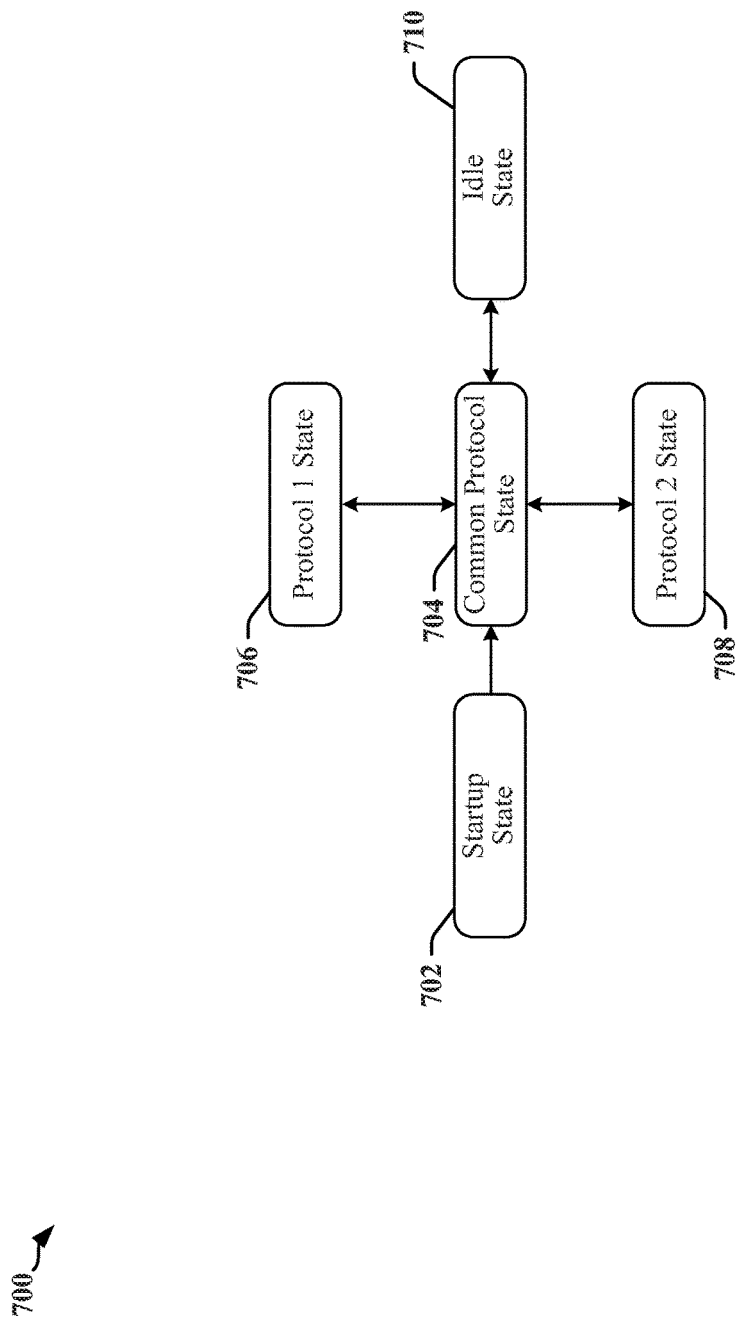
FIG. 7 illustrates a generalized scheme for transitioning between modes of operation of a serial bus and/or between multiple protocols that may be used on the serial bus in accordance with certain aspects disclosed herein.

FIG. 7 is a flow diagram 700 illustrating a generalized scheme for transitioning between containers or modes of operation of a shared bus 602. Each container, mode of operation and/or protocol may be associated with a corresponding operational state 702, 704, 706, 708, 710 of the shared bus 602. Modes of operation of the bus may distinguish between signaling schemes, data throughput, transmission formats and the like. Different modes of operation may be defined for a protocol.

In operation, a common protocol state 704 is used to exchange bus management commands using a common protocol that is understood by all bus master devices and/or by all devices on the bus. In one example, a single-protocol slave device may be unable to communicate using the common protocol and may consequently ignore bus management commands. In this latter example, a bus master device may take control of the shared bus 602 and communicate with the single-protocol slave device using the protocol understood by the single-protocol slave device.

In some examples, an I2C protocol is used in the common protocol state 704. In other examples, a different protocol may be used in the common protocol state 704. The shared bus 602 may be initialized into a startup state 702, whereby devices coupled to the shared bus 602 are configured for the common protocol. In single-bus master implementations of the common protocol, the designated bus master may discover and/or configure other devices coupled to the shared bus 602 in accordance with procedures defined by the common protocol. In multi-master implementations, one or more master devices may participate in a discovery, configuration and/or arbitration process to determine which bus master controls the shared bus 602 upon entry to the common protocol state 704. A bus hierarchical concept may be adopted, where one bus master device has active control of the shared bus 602 at any time, and other bus master devices request and wait for a grant control of the shared bus 602.

In the common protocol state 704, one or more devices may contend for control of the shared bus 602. The shared bus 602 may be operated in a desired or arbitrated protocol state 706, 708 to enable a communication transaction between devices coupled to the shared bus 602. Upon completion of the transaction, the shared bus 602 is returned to the common protocol state 704. When no device is requesting access to the shared bus 602, the shared bus 602 may enter an idle state 710. In the idle state, one or more devices may enter a power-down mode of operation. A bus-master device may cause the shared bus 602 to enter the common protocol state 704 periodically to determine if any device is requesting access to the shared bus 602. In some instances, the shared bus 602 may be returned to the common protocol state 704 in response to an interrupt or other event.

Entry into a protocol state 704, 706, 708 and exit from the protocol states 704, 706, 708 may be effected using bus management commands. These commands may be implemented using signaling, messaging, or some combination of signaling and messaging selected based on the architecture and design of the shared bus 602.

Data transfers may occur in the common protocol state 704 or one of the protocol states 706, 708 used by subsets of the devices coupled to the shared bus 602. The protocol states 706, 708 used by subsets of devices may be any protocol compatible with the shared bus 602. Data may be transferred in units of words, frames and/or packets, and flexible data transfer modes are contemplated.

In some instances, addresses may be dynamically allocated to devices coupled to the shared bus 602. In one example, dynamic address allocation is performed in the common protocol state 704 to provide unique identification of devices that communicate using the common protocol and to assign priority rankings for such devices. In some instances, dynamic address allocation is performed in one or more of the other protocol states 706, 708 to provide unique identification of devices that communicate using protocols other than the common protocol, and to assign priority rankings for such devices.

In some instances, an exception-handling scheme is defined for the common protocol state 704. For example, an I2C-compatible in-band interrupt procedure may be provided when the common protocol is I2C or a derivative of I2C. In some instances, a "hot-plug" procedure may be implemented, where that hot-plug procedure includes and/or uses in-band interrupt and the dynamic address allocation procedures.

Exemplary Description of Encoding/Decoding Data Based on Wire State Changes

In an aspect, an encoding scheme may use runs of 12 symbols as six pairs to create words. Each word includes 18 bits, formed from 16 bits of data and 2 bits of parity. The pairs of symbols are transmitted most significant symbol pair first. The most significant symbol in a pair is sent first.

Therefore, data is coded most significant bit (MSb) first as per a single data rate (SDR), so the first 16 data bits are transmitted in MSb followed by the 2 parity bits, P1 and P0. The 12 symbols translate to the 18 bits by coding each pair of symbols into 3 bits. Symbol codes 0, 1, or 2 may be based on the formula {(W1) XNOR (previous-W1), (W2 XNOR (previous-W2)}, where W1 is a first wire, W2 is a second wire, and XNOR is the logic "Exclusive-NOR" operation.

According to aspects disclosed herein, for two or more wires, a device such as an encoder may receive a binary string of data. The encoder may then split the binary string in frames, wherein a size of a frame may be as large as is suitable to cover a largest value of a base-N numeral chosen for symbols of the frame. For example, for a base-3 number implementation (i.e., two physical wires available) and two symbols slots, a largest value of the base-3 number is $2 \times 3^1 + 2 \times 3^0 = 2 \times 3 + 2 \times 1 = 6 + 2 = 8$ (wherein the numbers used to calculate the largest base-3 number value are in decimal (base-10) notation). However, a maximum covered full binary number is 7 (i.e., 3'b111). This number in decimal notation is $1 \times 2^2 + 1 \times 2^1 + 1 \times 2^0 = 4 + 2 + 1 = 7$.

In another example, for a base-7 number implementation (i.e., three physical wires available) and two symbols slots, a largest value of the base-7 number is $6 \times 7^1 + 6 \times 7^0 = 6 \times 7 + 6 \times 1 = 42 + 6 = 48$ (wherein the numbers used to calculate the largest base-7 number value are in decimal (base-10) notation). However, a maximum covered full binary number is 31 (i.e., 5'b1111). This number in decimal notation is $1 \times 2^4 + 1 \times 2^3 + 1 \times 2^2 + 1 \times 2^1 + 1 \times 2^0 = 16 + 8 + 4 + 2 + 1 = 31$.

The encoder may further calculate base-N coefficients of the value of each binary frame, i.e., on base-3 if ternary (two physical wires), or base-7 if septenary (three physical wires). The encoder then expresses the calculated coefficients in binary values and determines changes on the constitutive wires by applying an XNOR based formula described above for each wire. In an aspect, the XNOR based formula returning a value of "0" indicates that a state has changed while the XNOR based formula returning a value of "1" indicates no change of state.

According to aspects disclosed herein, for two or more wires, a device such as a decoder may evaluate changes of states on two or more wires. Based on a base-N number implementation, and a pre-established number of slots for base-N numbers, the decoder may calculate the value of a received number. For example, for the base-3 number implementation (i.e., two physical wires available) and two symbols slots, the coefficients received by the decoder may be any combination of 0, 1 or 2, in pairs of two successive symbols (as per the slots). The decoder may calculate the resultant number to be $(Symbol\_1) \times 3^1 + (Symbol\_2) \times 3^0 = (Symbol\_1) \times 3 + (Symbol\_2) \times 1$. Using the same methodology, the resultant number for any other combination of base-N numbers and a pre-established number of slots, as indicated in FIG. 11, may be calculated. The decoder may then express the calculated number in binary format, which is the decoded data.

For backward compatibility with other systems, the encoder and the decoder may perform an intelligent supplementary step, wherein the encoder may add dummy symbols or the decoder may ignore dummy symbols, according to aspects disclosed herein.

Figure 8:
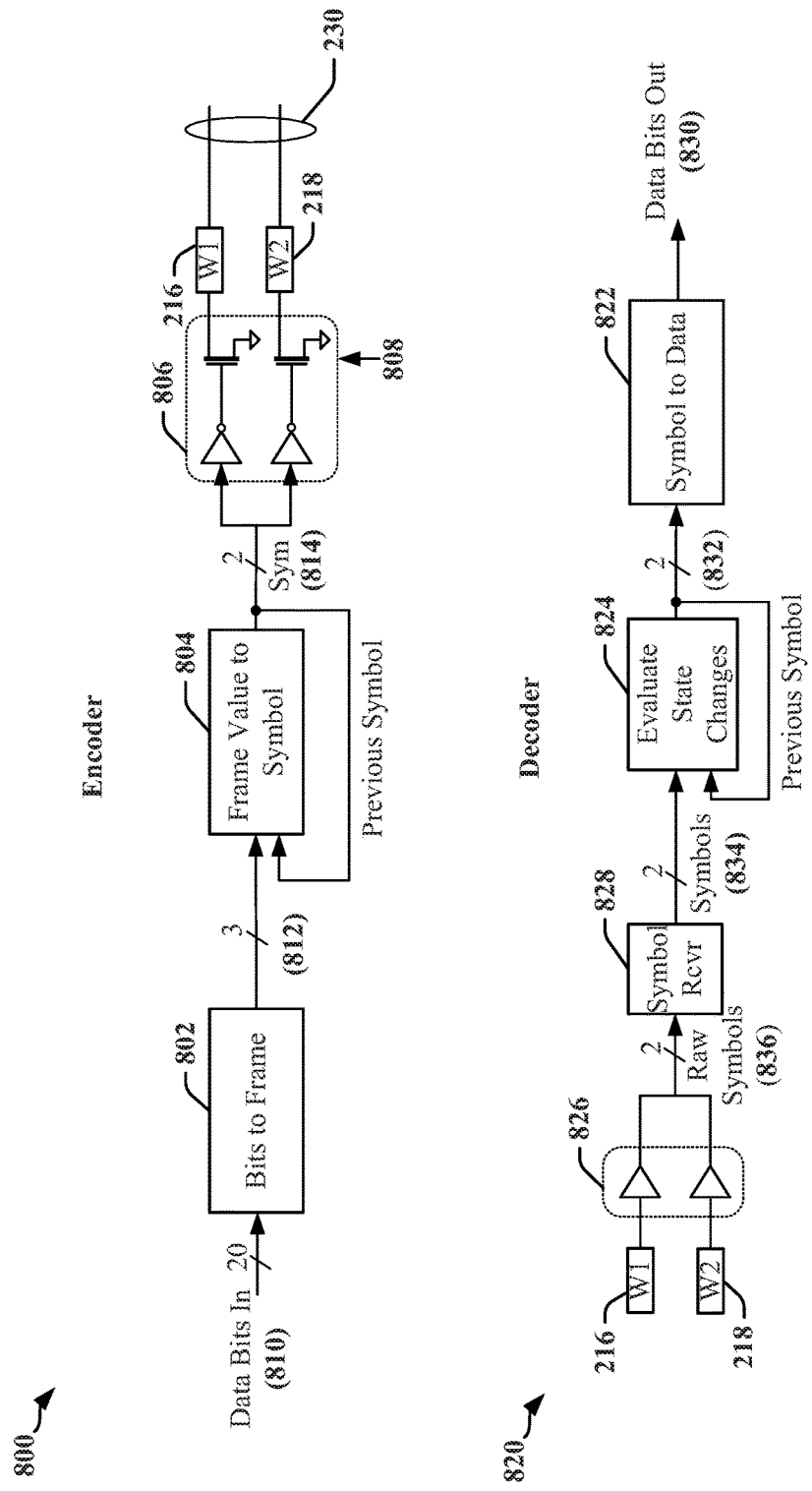
FIG. 8 is a block diagram illustrating an example of an encoder and a decoder configured according to certain aspects disclosed herein.

FIG. 8 is a block diagram illustrating an example of an encoder 800 and a decoder 820 configured according to certain aspects disclosed herein. The encoder 800 may transcode data 810 into larger numeral base (e.g. base 3, 7, 8, 10, 16, etc.) numbers. As shown in FIG. 8, the encoder 800 may transcode the data 810 into base-3 numbers that are encoded as symbols transmitted on a first signal wire W1 216 and a second signal wire W2 218. However, according to aspects of the disclosure, the encoder 800 may transcode the data into any base-N numbers (where N is greater than 2), wherein the numbers are encoded as symbols transmitted on more than two signal wires. In the example depicted, each data element (also referred to as a data word) of the input data 810 may have a predefined number of bits, such as 8, 12, 16, 19, or 20 bits. A bits to frame allocator 802 may receive a binary string of data to be encoded (input data) 810 and respectively allocate subsets of the binary string of data to a plurality of frames. For example, when the input data has a length of 20 bits, the bits to frame allocator 802 may allocate sequential subsets 812 of the binary string (e.g., every 3 bits of the 20-bit long input data 810) to respective frames.

A frame value to symbol convertor 804 determines a frame value of a frame by calculating a resultant number of a base-2 number polynomial using the sequential subset of bits 812 associated with the frame as base-2 coefficients. For example, if the sequential subset of bits associated with the frame is {1, 0, 1}, then the resultant number is $1 \times 2^2 + 0 \times 2^1 + 1 \times 2^0 = 4 + 1 = 5$. Hence, the frame value for the frame associated with the sequential subset of bits {1, 0, 1} is 5.

The frame value to symbol convertor 804 further calculates base-3 (ternary) coefficients of a base-3 number polynomial for the frame based on the frame value, where the base-3 coefficients respectively correspond to symbols of a sequence of symbols associated with the frame. Using the example above, if the frame value is 5, the equivalent base-3 number polynomial is $5 = 1 \times 3^1 + 2 \times 3^0$. Accordingly, the base-3 coefficients for the frame are 1 and 2, which respectively correspond to a first symbol and a second symbol of the sequence of symbols associated with the frame.

The frame value to symbol convertor 804 then calculates base-2 coefficients of a base-2 number polynomial for each symbol of the sequence of symbols according to a respective base-3 coefficient corresponding to each symbol. Using the example above, if the base-3 coefficient corresponding to the first symbol of the frame is 1, then the equivalent base-2 number polynomial is $1 = 0 \times 2^1 + 1 \times 2^0$. Accordingly, the base-2 coefficients for the first symbol are 0 and 1. Similarly, if the base-3 coefficient corresponding to the second symbol of the frame is 2, then the equivalent base-2 number polynomial is $2 = 1 \times 2^1 + 0 \times 2^0$. Accordingly, the base-2 coefficients for the second symbol are 1 and 0.

For two wires W1 and W2, a binary symbol may be based on the formula {(W1) XNOR (previous-W1), (W2) XNOR (previous-W2)}. Notably, a position of the XNOR operation for W1 (e.g., SCL) may be placed on the most significant bit position of the symbol to provide a simplified and scalable method of backward compatibility. Moreover, the base-2 coefficients calculated for a symbol may correspond to results of XNOR operations performed for the wires associated with the symbol. An XNOR operation returning a value of "0" indicates that a state has changed between a current state and a previous state of a wire. An XNOR operation returning a value of "1" indicates no change of state between the current state and the previous state of the wire.

Using the example above, the base-2 coefficients for the first symbol are 0 and 1. Accordingly, the first base-2 coefficient 0 corresponds to a result of the XNOR operation between a current state of a first wire (W1) and a previous state of the first wire (previous-W1), i.e., (W1) XNOR (previous-W1)=0. Hence, the frame value to symbol convertor 804 may determine a first bit of the first symbol based on the formula by determining a value for W1 based on knowledge of a previous-W1 value and the first base-2 coefficient. The second base-2 coefficient 1 corresponds to a result of the XNOR operation between a current state of a second wire (W2) and a previous state of the second wire (previous-W2), i.e., (W2) XNOR (previous-W2)=1. Hence, the frame value to symbol convertor 804 may determine a second bit of the first symbol based on the formula by determining a value for W2 based on knowledge of a previous-W2 value and the second base-2 coefficient. The frame value to symbol convertor 804 may determine first and second bits of the second symbol in a similar manner using the base-2 coefficients calculated for the second symbol.

A stream of 2-bit symbols 814 produced by the frame value to symbol convertor 804 are transmitted through line drivers 806. In the example depicted, the line drivers 806 include open-drain output transistors 808. However, in other examples, the line drivers 806 may drive the W1 216 and W2 218 signal wires using push-pull drivers.

The decoder 820 may include line interface circuits 826 that provide a stream of raw 2-bit symbols 836 from the W1 216 and/or W2 218 signal wires to a symbol receiver 828. In an aspect, the symbol receiver 828 receives a sequence of symbols in a frame. The sequence of symbols may represent a sequence of data bits that are allocated to the frame. Moreover, the sequence of data bits may be a subset of a binary string of data to be decoded, wherein subsets of the binary string are respectively allocated to a plurality of frames.

The symbol receiver 828 may include a clock and data recovery (CDR) circuit that extracts a receive clock from the raw symbols 836. The symbol receiver 828 provides a stream of 2-bit symbols 834 to a state change evaluator 824. The state change evaluator 824 evaluates changes of states of the wires W1 216 and W2 218 based on the sequence of symbols received from the symbol receiver 828 using the formula {(W1) XNOR (previous-W1), (W2) XNOR (previous-W2)} for a binary symbol.

A currently received symbol includes bits that respectively correspond to current states of the wires. Accordingly, the state change evaluator 824 may calculate state values for a symbol by performing an XNOR operation for each wire of the symbol. For example, a first bit of a received symbol corresponds to a current state of a first wire (W1). Accordingly, the state change evaluator 824 may calculate a first state value S1 for the symbol by performing an XNOR operation between the current state of the first wire (W1) and a previous state of the first wire (previous-W1), i.e., (W1) XNOR (previous-W1)=S1. A second bit of the received symbol corresponds to a current state of a second wire (W2). Accordingly, the state change evaluator 824 may calculate a second state value S2 for the symbol by performing an XNOR operation between the current state of the second wire (W2) and a previous state of the second wire (previous-W2), i.e., (W2) XNOR (previous-W2)=S2. The calculated state values 832 (e.g., S1 and S2) may be provided to a symbol to data convertor 822.

The symbol to data convertor 822 calculates symbol values for the sequence of symbols based on the state values 832. The state values may correspond to base-2 coefficients of a base-2 number polynomial corresponding to a symbol. Accordingly, the symbol to data convertor 822 may calculate a symbol value by calculating a resultant number of the base-2 number polynomial using the state values associated with the symbol. For example, if the state values {S1, S2} for a first symbol are {0, 1}, then the base-2 coefficients are 0 and 1, and the resultant number is $0 \times 2^1 + 1 \times 2^0 = 0 + 1 = 1$. Hence, the symbol value for the first symbol is 1. Similarly, if the state values {S1, S2} for a second symbol are {1, 0}, then the base-2 coefficients are 1 and 0, and the resultant number is $1 \times 2^1 + 0 \times 2^0 = 2 + 0 = 2$. Hence, the symbol value for the second symbol is 2.

The symbol values of a sequence of symbols in a frame may correspond to base-N coefficients of a base-N number polynomial, where N is greater than 2. In the example above, the first and second symbol values of the frame respectively correspond to base-3 coefficients of a base-3 (ternary) number polynomial. Accordingly, the symbol to data convertor 822 may further calculate a frame value by calculating a resultant number of the base-3 number polynomial using the symbol values associated with the frame. Using the example above, the first symbol value of 1 corresponds to a first base-3 coefficient and the second symbol value of 2 corresponds to a second base-3 coefficient. Accordingly, the resultant number is $1 \times 3^1 + 2 \times 3^0 = 5$. Hence, the frame value for the frame including the first and second symbols is 5. The symbol to data convertor 822 then expresses the frame value in a binary format to recover the sequence of data bits 830. Here, the frame value of 5 may be expressed as $5 = 1 \times 2^2 + 0 \times 2^1 + 1 \times 2^0$, which is equivalent to the binary data bit sequence {1, 0, 1}.

In an aspect, ternary numbers may be framed in any number of symbol slots. For example, a 3-bit number may be framed in two ternary symbol slots, an 8-bit number may be framed in six ternary symbol slots, and a 19-bit number may be framed in 12 ternary symbol slots. For a higher numeral base number, e.g., a base-7 number (i.e., septenary) using three wires, a frame of two septenary symbol slots can deliver decimal 48, which covers decimal 31, which is five bits of output data ($2^5-1$).

FIG. 9 illustrates a Table 900 that results from an encoding/decoding scheme utilizing the XNOR operation (XNOR encoding scheme). The XNOR encoding scheme may be used by the encoder 800 to produce a sequence of symbols 814 for transmission on the bus 230. The XNOR encoding scheme may also be used by the decoder 820 to extract base-N coefficients of a base-N number polynomial from symbols received from the bus 230. FIG. 9 specifically pertains to an XNOR encoding scheme applied to two wires (e.g., W1 216 and W2 218) using a base-3 (ternary) number implementation. However, in general, the XNOR encoding scheme may be applied to an additional number of wires (e.g., 4, 5, 6, etc. wires). For example, the XNOR encoding scheme may be applied to three wires using a base-7 number (septenary) implementation, four wires using a base-15 number (pentadecimal) implementation, and five wires using a base-31 number implementation.

In an aspect, for a given numeral base, transmitted numbers can be framed in various lengths. The length of the frame determines the power of the data base that coefficients multiply. For example, in the ternary implementation using two symbol slots in a frame, the number is given by the polynomial $T1 \times 3^1 + T0 \times 3^0$. Using 12 symbol slots in a frame, the number is given by the polynomial $T11 \times 3^{11} + T10 \times 3^{10} + \ldots + T1 \times 3^1 + T0 \times 3^0$. In another example, in the septenary implementation using two symbol slots in a frame, the number is given by $S1 \times 7^1 + S0 \times 7^0$. Using 12 symbol slots in a frame, the number is given by $S11 \times 7^{11} + S10 \times 7^{10} + \ldots + S1 \times 7^1 + S0 \times 7^0$.

In an example, for three wires W1, W2 and W3, a binary symbol may be based on the formula {(W1) XNOR (previous-W1), (W2) XNOR (previous-W2), (W3) XNOR (previous-W3)}. For two wires (e.g., W1 and W2), the formula for the binary symbol becomes {(W1) XNOR (previous-W1), (W2) XNOR (previous-W2)}, as mentioned above. The W3 bit is not present since there are only two wires. A position of the XNOR operation for W1 (e.g., SCL) may be placed on the most significant bit position of the symbol to provide a simplified and scalable method of backward compatibility.

Table 900 of FIG. 9 will now be further discussed. The encoding/decoding of a sequence of data bits (e.g., equivalent to 3-bit values 0, 1, 2, 3, 4, 5, 6, and 7) in Table 900 into/from a sequence of symbols is based on the above-mentioned formula {(W1) XNOR (previous-W1), (W2) XNOR (previous-W2)}. The Table 900 also depicts a special case where a decoding operation returns a value of 8. However, because the value of 8 cannot be expressed in a binary format using three bits, the decoding operation returning the value of 8 is considered to indicate an error. To illustrate an encoding operation using the formula, encoding of a sequence of data bits equivalent to a 3-bit value of 2 will be described.

A sequence of three data bits {0, 1, 0} of a frame may be expressed as $0\times2^2+1\times2^1+0\times2^0=0+2+0=2$. Hence, {0, 1, 0} is equivalent to a frame value of 2. The encoder may use the frame value 2 to calculate a first base-3 (ternary) coefficient and a second base-3 coefficient of a base-3 number polynomial for the frame. The first and second base-3 coefficients respectively correspond to first and second symbols of the frame. Accordingly, when the frame value is 2, the equivalent base-3 number polynomial is $2=0\times3^1+2\times3^0$. Accordingly, the first base-3 coefficient for the flame is 0 corresponding to the first symbol and the second base-3 coefficient for the frame is 2 corresponding to the second symbol.

The encoder may then calculate base-2 coefficients of a base-2 number polynomial for each of the first symbol and second symbol according to the base-3 coefficient corresponding to each symbol. Here, the first base-3 coefficient corresponding to the first symbol is 0. The equivalent base-2 number polynomial is given by $0=0\times2^1+0\times2^0$. Accordingly, the base-2 coefficients for the first symbol are 0 and 0→{0, 0}. Similarly, the second base-3 coefficient corresponding to the second symbol is 2. The equivalent base-2 number polynomial is given by $2=1\times2^1+0\times2^0$. Accordingly, the base-2 coefficients for the second symbol are 1 and 0→{1, 0}.

For two wires W1 and W2, a binary symbol is based on the formula {(W1) XNOR (previous-W1), (W2) XNOR (previous-W2)}. As such, each of the first symbol and second symbol may be determined based on an XNOR operation between a current state of a first wire (W1) and a previous state of the first wire (prev-W1) that returns a first state value for W1, and an XNOR operation between a current state of a second wire (W2) and a previous state of the second wire (prev-W2) that returns a second state value for W2. When the first state value is 0, a change (or "pull down") in state between W1 and prev-W1 is indicated. When the first state value is 1, no change (or "no action") in state between W1 and prev-W1 is indicated. When the second state value is 0, a change (or "pull down") in state between W2 and prev-W2 is indicated. When the second state value is 1, no change (or "no action") in state between W2 and prev-W2 is indicated.

Accordingly, when the base-2 coefficients {first base-2 coefficient, second base-2 coefficient} for the first symbol are {0, 0}, the first base-2 coefficient 0 corresponds to a result of the XNOR operation between a current state of a first wire (W1) and a previous state of the first wire (prev-W1), i.e., XNOR (W1, prev-W1)=0. Hence, the encoder may determine a first bit of the first symbol by determining an appropriate value for W1 based on knowledge of prev-W1 and the first base-2 coefficient. The second base-2 coefficient 0 corresponds to a result of the XNOR operation between a current state of a second wire (W2) and a previous state of the second wire (prev-W2), i.e., XNOR (W2, prev-W2)=0. Hence, the encoder may determine a second bit of the first symbol by determining an appropriate value for W2 based on knowledge of prev-W2 and the second base-2 coefficient.

When the base-2 coefficients {first base-2 coefficient, second base-2 coefficient} for the second symbol are {1, 0}, the first base-2 coefficient 1 corresponds to a result of the XNOR operation between a current state of a first wire (W1) and a previous state of the first wire (prev-W1), i.e., XNOR (W1, prev-W1)=1. Hence, the encoder may determine a first bit of the second symbol by determining an appropriate value for W1 based on knowledge of prev-W1 and the first base-2 coefficient. The second base-2 coefficient 0 corresponds to a result of the XNOR operation between a current state of a second wire (W2) and a previous state of the second wire (prev-W2), i.e., XNOR (W2, prev-W2)=0. Hence, the encoder may determine a second bit of the second symbol by determining an appropriate value for W2 based on knowledge of prev-W2 and the second base-2 coefficient.

The other sequences of data bits equivalent to 3-bit values of 0, 1, 3, 4, 5, 6, and 7) in Table 900 may be encoded according to the same XNOR encoding scheme used to encode the sequence of bits {0, 1, 0} equivalent to the 3-bit value of 2, as described above. At the transmitter 300 or encoder 800, the XNOR encoding scheme may be used to determine a current symbol to be transmitted, given knowledge of a previously generated symbol and input ternary coefficients. At the receiver 320 or decoder 820, the XNOR encoding scheme may be used to determine ternary coefficients that represent the transition between the previously received symbol and the currently received symbol.

To illustrate a decoding operation using the XNOR scheme, decoding of a sequence of symbols to recover a 3-bit value of 5 will be described. A symbol currently received by a decoder includes bits that respectively correspond to current states of the wires W1 and W2. Accordingly, the decoder may calculate state values for the symbol by performing the XNOR operation for each wire of the symbol. For example, a first bit of a received symbol corresponds to a current state of a first wire (W1). Accordingly, the decoder may calculate a first state value S1 for the symbol by performing an XNOR operation between the current state of the first wire (W1) and a previous state of the first wire (previ-W1), i.e., XNOR (W1, prev-W1)=S1. A second bit of the received symbol corresponds to a current state of a second wire (W2). Accordingly, the decoder may calculate a second state value S2 for the symbol by performing an XNOR operation between the current state of the second wire (W2) and a previous state of the second wire (prev-W2), i.e., XNOR (W2, prev-W2)=S2.

The decoder symbol values for a first symbol and second symbol based on the state values S1 and S2. The state values may correspond to base-2 coefficients of a base-2 number polynomial corresponding to a symbol. Accordingly, the decoder may calculate a symbol value by calculating a resultant number of the base-2 number polynomial using the state values associated with the symbol. For example, if the state values {S1, S2} for the first symbol are {0, 1}, then the base-2 coefficients are 0 and 1, and the resultant number is $0\times2^1+1\times2^0=0+1=1$. Hence, the symbol value for the first symbol is 1. Similarly, if the state values {S1, S2} for a second symbol are {1, 0}, then the base-2 coefficients are 1 and 0, and the resultant number is $1\times2^1+0\times2^0=2+0=2$. Hence, the symbol value for the second symbol is 2.

The symbol values of the first symbol and second symbol in a frame respectively correspond to base-3 coefficients of a base-3 (ternary) number polynomial. Accordingly, the decoder may further calculate a frame value by calculating a resultant number of the base-3 number polynomial using the symbol values associated with the frame. Here, the first symbol value of 1 corresponds to a first base-3 coefficient and the second symbol value of 2 corresponds to a second base-3 coefficient. Accordingly, the resultant number is $1\times3^1+2\times3^0=5$. The decoder may then express the resultant number in a binary format to recover the sequence of data bits {1, 0, 1}, i.e., $5=1\times2^2+0\times2^1+1\times2^0$, which is equivalent to the binary data bit sequence {1, 0, 1}.

In an aspect, the XNOR encoding scheme uses basic gates for deriving the ternary (or larger numeral base) coefficients. For the least complex symbol based data transfer, namely on base 3 (ternary) numbers, aspects disclosed herein allow for ease of coding and decoding and the ability to directly read the ternary coefficients without need of a translation table. For larger numeral bases, e.g., base 7 (septenary) or base 15 (pentadecimal) numbers, implemented on 3 wires or 4 wires, respectively, aspects disclosed herein allow for ease of coding and decoding as well as reduce the number of gates required for implementation. Aspects disclosed herein also provide benefits for practical systems (e.g., Improved Inter-Integrated Circuit (I3C)) where it is necessary to ensure backwards compatibility with previously used interfaces of different types.

The different types of interfaces may use one physical wire for providing a clock signal related to a data transfer. The data transfer itself may occur on adjacent wires of the same interface. In an aspect, the clock signal may be embedded into the wires designated for the data transfer in order to increase data throughput while using the same number of total physical wires. According to aspects of the present disclosure, the XNOR encoding scheme may position the clock wire activity to the most significant bit position of the symbols. Moreover, due to the XNOR based coding, the inactivity on that wire may be coded as "1".

An exemplary scheme for backwards compatible high speed data transfer may pull down a first wire W1 (e.g., SCL) to a LOW level, faster than 50 ns. This may be referred to as an "All SCL LOW" scheme. Consequently, according to such scheme, a dummy symbol that decreases data throughput may unnecessarily be added to the data stream.

To avoid unnecessarily adding the dummy symbol to the data stream, another exemplar scheme for backwards compatible high speed data transfer intelligently pulls down the SCL only if a next symbol does not require the W1 to go down naturally. This may be referred to as a "Select SCL LOW" scheme. Aspects of the present disclosure (e.g., XNOR encoding scheme) allow for the discernment between necessary dummy symbols and symbols that return the SCL to a LOW level naturally. This may be implemented using a multiple-input XOR gate and AND/NAND gates.

Assuming that a data transfer stage starts with the first wire W1 (e.g., SCL) at a LOW position, the Select SCL LOW high speed data transfer scheme may be as follows:
1) Any symbol that has the MSb "1" does not need to be followed by a dummy symbol.
2) Any symbol that has MSb "0" and is followed by any symbol that has the MSb "0" and at least one of the remaining bits "0" does not need to be followed by a dummy symbol.
3) Any symbol that has MSb "0" and is followed by any symbol that has the MSb "0" and all of the remaining bits "1" does need to be followed by a dummy symbol.
4) Any symbol that has MSb "0" and is followed by any symbol that has the MSb "1" does need to be followed by a dummy symbol.
5) A dummy symbol can be followed by any symbol since the dummy symbol brings the SCL to a LOW level.

Consequently, the dummy symbol is made of a binary "0" followed by only "1" for the rest of the binary positions (which are equal to the rest of the physical wires used by the respective interface). In an aspect, the "Select SCL LOW" scheme may provide a better than 20% increase in average data throughput with respect to the "All SCL LOW" scheme. Moreover, the "Select SCL LOW" scheme may provide a higher average data throughput than a corresponding Double Data Rate (DDR) protocol on the same hardware lines.

Figure 10:
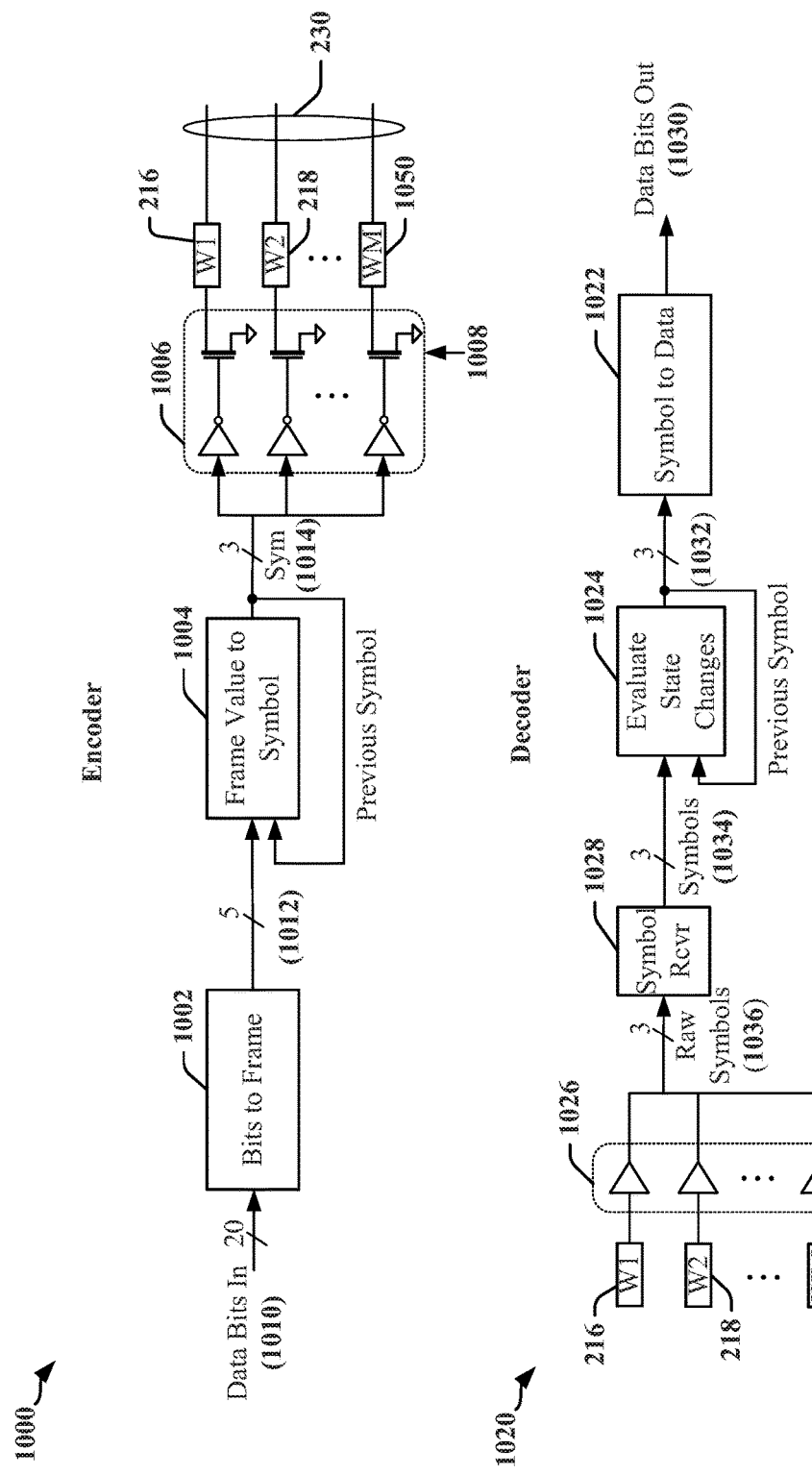
FIG. 10 is a block diagram illustrating another example of an encoder and a decoder configured according to certain aspects disclosed herein.

FIG. 10 is a block diagram illustrating an example of an encoder 1000 and a decoder 1020 configured according to certain aspects disclosed herein. For bus operations, the encoder 1000 may transcode data 1010 into larger numeral base (e.g., base 3, 7, 8, 10, 16, etc.) numbers. As shown in FIG. 10, the encoder 1000 may transcode the data 1010 into base-N numbers (N greater than 2) that are encoded as symbols transmitted on a plurality of signal wires (e.g. transmitted on a first signal wire W1 216 to an M-th single wire WM 1050). As discussed below, a base-7 (septenary) number implementation on three wires will be described, i.e., WM=W3. However, the encoder/decoder of FIG. 10 is not so limited as other numeral base implementations are contemplated. In the example depicted, each data element (also referred to as a data word) of the input data 1010 may have a predefined number of bits, such as 8, 12, 16, 19, or 20 bits. A bits to frame allocator 1002 may receive a binary string of data to be encoded (input data) 1010 and respectively allocate subsets of the binary string of data to a plurality of frames. For example, in a base-7 (septenary) number implementation, when the input data has a length of 20 bits, the bits to frame allocator 1002 may allocate sequential subsets of 5 bits 1012 of the binary string to respective frames.

A frame value to symbol convertor 1004 determines a frame value of a frame by calculating a resultant number of a base-2 number polynomial using the sequential subset of bits 1012 associated with the frame as base-2 coefficients. The frame value to symbol convertor 1004 further calculates base-7 (septenary) coefficients of a base-7 number polynomial for the frame based on the frame value, where the base-7 coefficients respectively correspond to symbols of a sequence of symbols associated with the frame. The frame value to symbol convertor 1004 then calculates base-2 coefficients of a base-2 number polynomial for each symbol of the sequence of symbols (e.g. three base-2 coefficients per symbol) according to a respective base-7 coefficient corresponding to each symbol.

For three wires W1, W2 and W3, a binary symbol may be based on the formula {(W1) XNOR (previous-W1), (W2) XNOR (previous-W2), (W3) XNOR (previous-W3)}. The base-2 coefficients calculated for a symbol may correspond to results of XNOR operations performed for the wires associated with the symbol. An XNOR operation returning a value of "0" indicates that a state has changed between a current state and a previous state of a wire. An XNOR operation returning a value of "1" indicates no change of state between the current state and the previous state of the wire.

A first base-2 coefficient corresponds to a result of the XNOR operation between a current state of a first wire (W1) and a previous state of the first wire (previous-W1), i.e., (W1) XNOR (previous-W1)=first base-2 coefficient. Hence, the frame value to symbol convertor 1004 may determine a first bit of a symbol based on the formula by determining a value for W1 based on knowledge of a previous-W1 value and the first base-2 coefficient. A second base-2 coefficient corresponds to a result of the XNOR operation between a current state of a second wire (W2) and a previous state of the second wire (previous-W2), i.e., (W2) XNOR (previous-W2)=second base-2 coefficient. Hence, the frame value to symbol convertor 1004 may determine a second bit of the symbol based on the formula by determining a value for W2 based on knowledge of a previous-W2 value and the second base-2 coefficient. A third base-2 coefficient corresponds to a result of the XNOR operation between a current state of a third wire (W3) and a previous state of the third wire (previous-W3), i.e., (W3) XNOR (previous-W3)=third base-2 coefficient. Hence, the frame value to symbol convertor 1004 may determine a third bit of the symbol based on the formula by determining a value for W3 based on a knowledge of a previous-W3 value and the third base-2 coefficient.

A stream of 3-bit symbols 1014 produced by the frame value to symbol convertor 1004 are transmitted through line drivers 1006. In the example depicted, the line drivers 1006 include open-drain output transistors 1008. However, in other examples, the line drivers 1006 may drive the W1 216, W2 218, and WM (e.g., W3) 1050 signal wires using push-pull drivers.

The decoder 1020 may include line interface circuits 1026 that provide a stream of raw 3-bit symbols 1036 from the W1 216, W2 218, and/or WM (e.g., W3) 1050 signal wires to a symbol receiver 1028. In an aspect, the symbol receiver 1028 receives a sequence of symbols in a frame. The sequence of symbols may represent a sequence of data bits that are allocated to the frame. Moreover, the sequence of data bits may be a subset of a binary string of data to be decoded, wherein subsets of the binary string are respectively allocated to a plurality of frames.

The symbol receiver 1028 may include a clock and data, recovery (CDR) circuit that extracts a receive clock from the raw symbols 1036. The symbol receiver 1028 provides a stream of 3-bit symbols 1034 to a state change evaluator 1024. The state change evaluator 1024 evaluates changes of states of the wires W1 216, W2 218, and WM (e.g., W3) 1050 based on the sequence of symbols received from the symbol receiver 1028 using the formula {(W1) XNOR (previous-W1), (W2) XNOR (previous-W2), (W3) XNOR (previous-W3)} for a binary symbol.

A currently received symbol includes bits that respectively correspond to current states of the wires. Accordingly, the state change evaluator 1024 may calculate state values for a symbol by performing an XNOR operation for each wire of the symbol. For example, a first bit of a received symbol corresponds to a current state of a first wire (W1). Accordingly, the state change evaluator 1024 may calculate a first state value S1 for the symbol by performing an XNOR operation between the current state of the first wire (W1) and a previous state of the first wire (previous-W1), i.e., (W1) XNOR (previous-W1)=S1. A second bit of the received symbol corresponds to a current state of a second wire (W2). Accordingly, the state change evaluator 1024 may calculate a second state value S2 for the symbol by performing an XNOR operation between the current state of the second wire (W2) and a previous state of the second wire (previous-W2), i.e., (W2) XNOR (previous-W2)=S2. A third bit of the received symbol corresponds to a current state of a third wire (W3). Accordingly, the state change evaluator 1024 may calculate a third state value S3 for the symbol by performing an XNOR operation between the current state of the third wire (W3) and a previous state of the third wire (previous-W3), i.e., (W3) XNOR (previous-W3)=S3. The calculated state values 1032 (e.g., {S1, S2, S3}) may be provided to a symbol to data convertor 1022.

The symbol to data convertor 1022 calculates symbol values for the sequence of symbols based on the state values 1032. The state values may correspond to base-2 coefficients of a base-2 number polynomial corresponding to a symbol. Accordingly, the symbol to data convertor 1022 may calculate a symbol value by calculating a resultant number of the base-2 number polynomial using the state values associated with the symbol. For example, if the state values {S1, S2, S3} for a first symbol are {0, 1, 1}, then the base-2 coefficients are 0, 1, and 1, and the resultant number is $0 \times 2^2 + 1 \times 2^1 + 1 \times 2^0 = 0 + 2 + 1 = 3$. Hence, the symbol value for the first symbol is 3. If the state values {S1, S2, S3} for a second symbol are {1, 0, 0}, then the base-2 coefficients are 1, 0, and 0, and the resultant number is $1 \times 2^2 + 0 \times 2^1 + 0 \times 2^0 = 2 + 0 + 0 = 2$. Hence, the symbol value for the second symbol is 2.

The symbol values of a sequence of symbols in a frame may correspond to base-N coefficients of a base-N number polynomial, where N is greater than 2. In the example above, the first and second symbol values of the frame respectively correspond to base-7 coefficients of a base-7 (septenary) number polynomial. Accordingly, the symbol to data convertor 1022 may further calculate a frame value by calculating a resultant number of the base-7 number polynomial using the symbol values associated with the frame. Using the example above, the first symbol value of 3 corresponds to a first base-7 coefficient and the second symbol value of 2 corresponds to a second base-7 coefficient. Accordingly, the resultant number is $3 \times 7^1 + 2 \times 7^0 = 21 + 2 = 23$. Hence, the frame value for the frame including the first and second symbols is 23. The symbol to data convertor 1022 then expresses the frame value in a binary format to recover the sequence of data bits 1030. Here, the frame value of 23 may be expressed as $23 = 1 \times 2^4 + 0 \times 2^3 + 1 \times 2^2 + 1 \times 2^1 + 1 \times 2^0$, which is equivalent to the binary data bit sequence {1, 0, 1, 1, 1}.

According to aspects disclosed herein, a basic data transfer link may be one physical transport line, such as one physical wire or one over-the-air transmission slot, for example. One basic data transfer link may support binary coding of data. The binary symbols are set in controlled time slots, so as to be identifiable. In one aspect, additional basic data transfer links may be implemented to increase a data rate. A result of such implementation may linearly increase the data rate. In another aspect, the data rate may be increased by providing additional coding information in the data stream. For example, as disclosed herein, the data stream may be coded using higher level numeral systems.

In general, a scheme for coding the data stream may be as follows. First, the binary data stream is framed at an established length. By framing the data stream, the binary symbols are assigned a defined weight. As a result, a total numerical value of the data frame is obtained. The resultant numerical value of the data frame may then be converted into a higher level numeral base number, e.g., ternary, octal, decimal, hexadecimal, etc. The numeral data base may be chosen such that the related necessary symbols can be implemented on an appropriate number (e.g., 2, 3 or 4) of basic data transfer links.

In the case of two basic data transfer links, implemented on two phase differential wires, three different symbols may be available. Consequently, ternary base symbols coding is suitable for such case. In the case of three basic data transfer links, implemented on three phase differential wires, seven different symbols may be available. Consequently, septenary base symbols coding is suitable for such case.

FIG. 11 is a Table 1100 illustrating a number of symbols that would be available for various combinations of a number of basic data transfer links (wires) and a number of slots of a frame. In particular, Table 1100 provides a maximum number for symbols available corresponding to an implementation using M wires and N slots, where M is an integer from 2 to 12 and N is an integer from 2 to 12. In an aspect, numerous criteria may exist for choosing a most suitable number of symbol slots with respect to the number of wires that are available. For example, the number of symbol slots chosen may be based on a desire to express binary numbers into an 8-bit format. In another example, the number of symbol slots chosen may be based on a channel capacity, wherein the channel capacity dictates the number of codes of the available symbols that fully cover a given number of binary slots.

Exemplary Device and Method for Encoding Data Based on Wire State Changes

Figure 12:
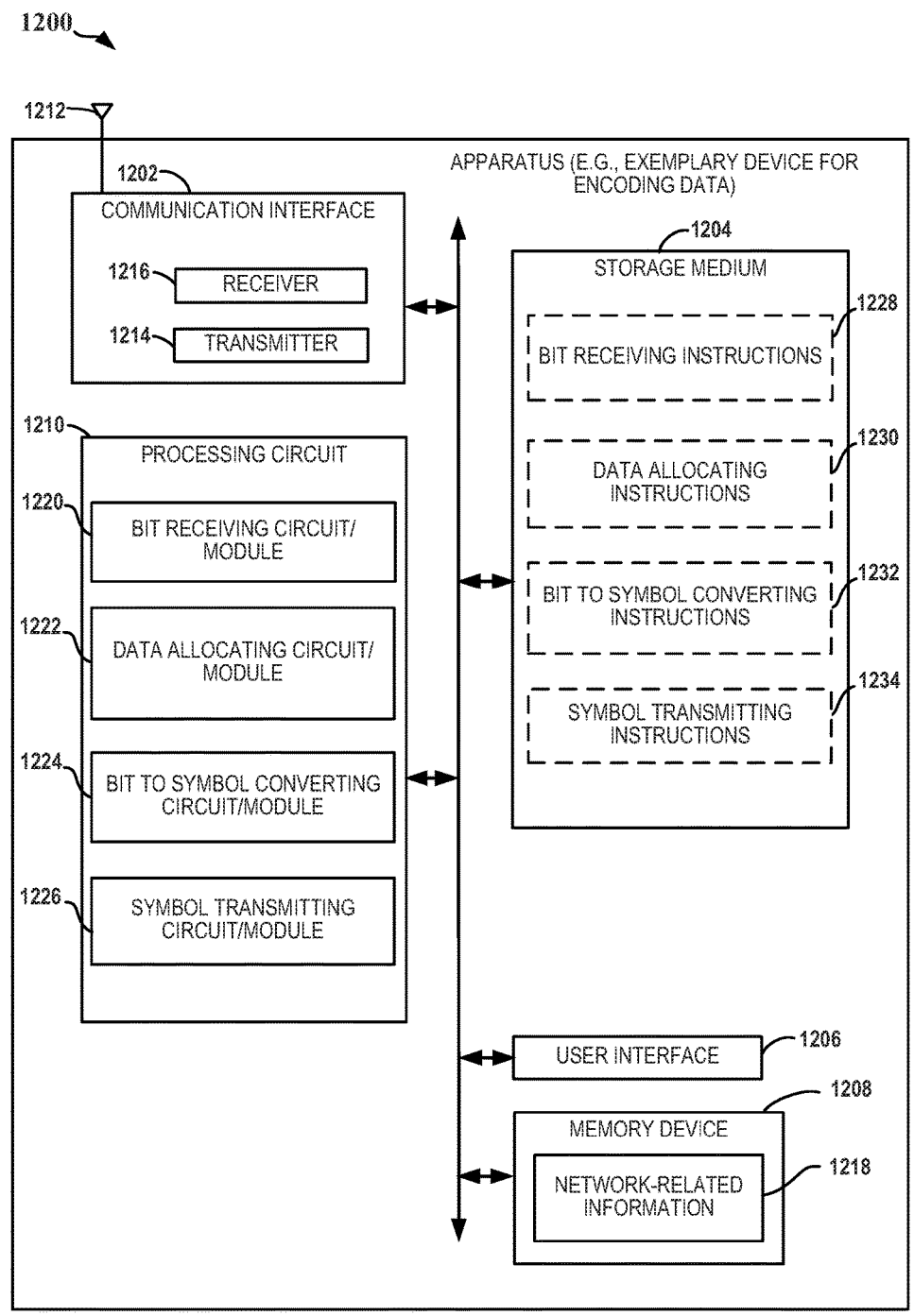
FIG. 12 illustrates an apparatus configured to support operations related to encoding data in a data communications interface according to one or more aspects of the disclosure.

FIG. 12 is an illustration of an apparatus 1200 configured to support operations related to encoding data in a data communications interface according to one or more aspects of the disclosure (e.g., aspects related to the method of FIG. 13 described below). The apparatus 1200 includes a communication interface (e.g., at least one transceiver) 1202, a storage medium 1204, a user interface 1206, a memory device 1208, and a processing circuit 1210.

These components can be coupled to and/or placed in electrical communication with one another via a signaling bus or other suitable component, represented generally by the connection lines in FIG. 12. The signaling bus may include any number of interconnecting buses and bridges depending on the specific application of the processing circuit 1210 and the overall design constraints. The signaling bus links together various circuits such that each of the communication interface 1202 the storage medium 1204, the user interface 1206, and the memory device 1208 are coupled to and/or in electrical communication with the processing circuit 1210. The signaling bus may also link various other circuits (not shown) such as timing sources, peripherals, voltage regulators, and power management circuits, which are well known in the art, and therefore, will not be described any further.

The communication interface 1202 may be adapted to facilitate wireless communication of the apparatus 1200. For example, the communication interface 1202 may include circuitry and/or code (e.g., instructions) adapted to facilitate the communication of information bi-directionally with respect to one or more communication devices in a network. The communication interface 1202 may be coupled to one or more antennas 1212 for wireless communication within a wireless communication system. The communication interface 1202 can be configured with one or more standalone receivers and/or transmitters, as well as one or more transceivers. In the illustrated example, the communication interface 1202 includes a transmitter 1214 and a receiver 1216.

The memory device 1208 may represent one or more memory devices. As indicated, the memory device 1208 may maintain network-related information 1218 along with other information used by the apparatus 1200. In some implementations, the memory device 1208 and the storage medium 1204 are implemented as a common memory component. The memory device 1208 may also be used for storing data that is manipulated by the processing circuit 1210 or some other component of the apparatus 1200.

The storage medium 1204 may represent one or more computer-readable, machine-readable, and/or processor-readable devices for storing code, such as processor executable code or instructions (e.g., software, firmware), electronic data, databases, or other digital information. The storage medium 1204 may also be used for storing data that is manipulated by the processing circuit 1210 when executing code. The storage medium 1204 may be any available media that can be accessed by a general purpose or special purpose processor, including portable or fixed storage devices, optical storage devices, and various other mediums capable of storing, containing or carrying code.

By way of example and not limitation, the storage medium 1204 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1204 may be embodied in an article of manufacture (e.g., a computer program product). By way of example, a computer program product may include a computer-readable medium in packaging materials. In view of the above, in some implementations, the storage medium 1204 may be a non-transitory (e.g., tangible) storage medium.

The storage medium 1204 may be coupled to the processing circuit 1210 such that the processing circuit 1210 can read information from, and write information to, the storage medium 1204. That is, the storage medium 1204 can be coupled to the processing circuit 1210 so that the storage medium 1204 is at least accessible by the processing circuit 1210, including examples where at least one storage medium is integral to the processing circuit 1210 and/or examples where at least one storage medium is separate from the processing circuit 1210 (e.g., resident in the apparatus 1200, external to the apparatus 1200, distributed across multiple entities, etc.).

Code and/or instructions stored by the storage medium 1204, when executed by the processing circuit 1210, causes the processing circuit 1210 to perform one or more of the various functions and/or process operations described herein. For example, the storage medium 1204 may include operations configured for regulating operations at one or more hardware blocks of the processing circuit 1210, as well as to utilize the communication interface 1202 for wireless communication utilizing their respective communication protocols.

The processing circuit 1210 is generally adapted for processing, including the execution of such code/instructions stored on the storage medium 1204. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1210 is arranged to obtain, process and/or send data, control data access and storage, issue commands, and control other desired operations. The processing circuit 1210 may include circuitry configured to implement desired code provided by appropriate media in at least one example. For example, the processing circuit 1210 may be implemented as one or more processors, one or more controllers, and/or other structure configured to execute executable code. Examples of the processing circuit 1210 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1210 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1210 are for illustration and other suitable configurations within the scope of the disclosure are also contemplated.

According to one or more aspects of the disclosure, the processing circuit 1210 may be adapted to perform any or all of the features, processes, functions, operations and/or routines for any or all of the apparatuses described herein. As used herein, the term "adapted" in relation to the processing circuit 1210 may refer to the processing circuit 1210 being one or more of configured, employed, implemented, and/or programmed to perform a particular process, function, operation and/or routine according to various features described herein.

Figure 13:
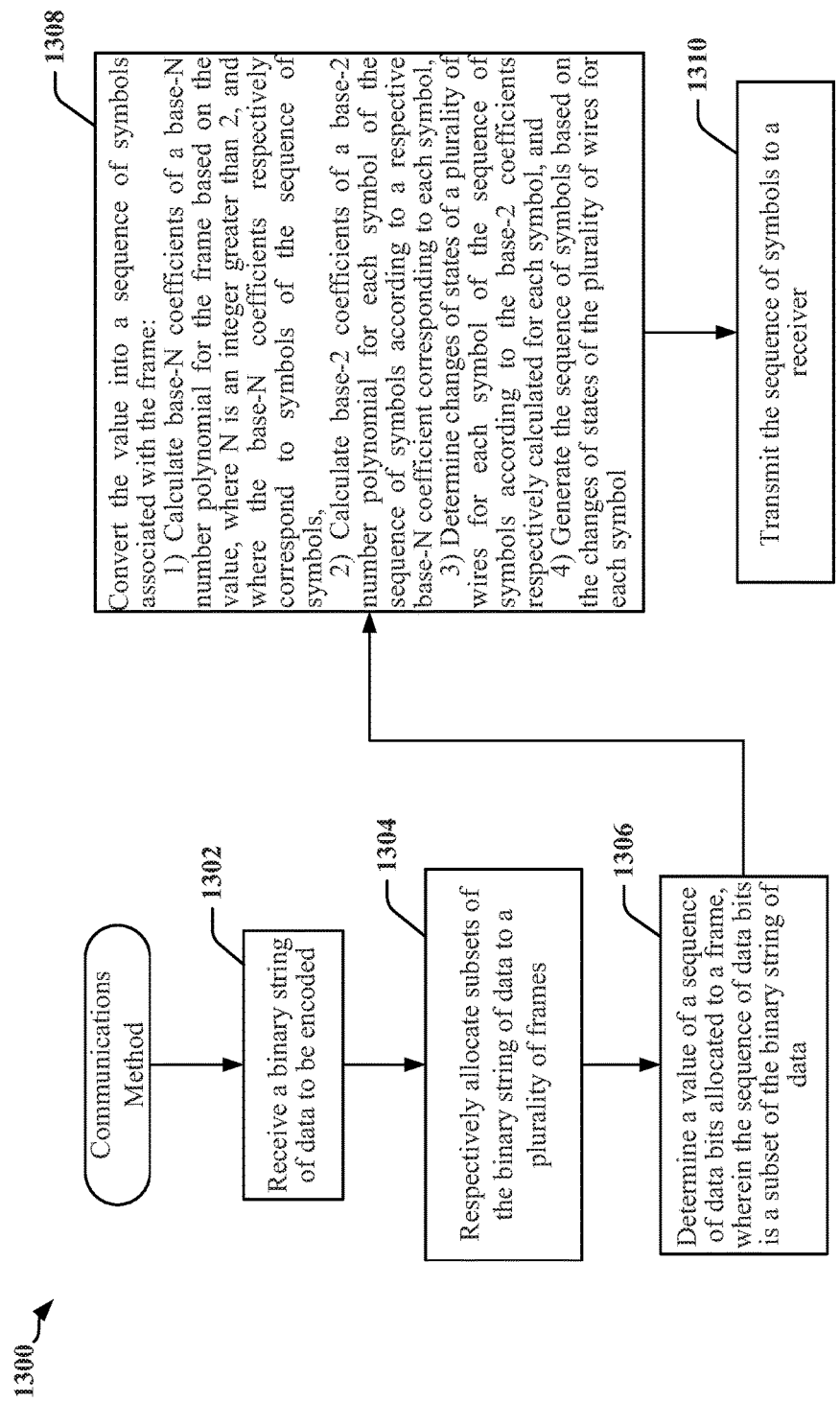
FIG. 13 is a flowchart illustrating a method for data communications on a serial bus interface according to one or more aspects disclosed herein.

According to at least one example of the apparatus 1200, the processing circuit 1210 may include one or more of a bit receiving circuit/module 1220, a data allocating circuit module 1222, a bit to symbol converting circuit/module 1224, and a symbol transmitting circuit/module 1226, that are adapted to perform any or all of the features, processes, functions, operations and/or routines described herein (e.g., features, processes, functions, operations and/or routines described with respect to FIG. 13).

The bit receiving circuit/module 1220 may include circuitry and/or instructions (e.g., bit receiving instructions 1228 stored on the storage medium 1204) adapted to perform several functions relating to, for example, receiving a binary string of data to be encoded.

The data allocating circuit/module 1222 may include circuitry and/or instructions (e.g., data allocating instructions 1230 stored on the storage medium 1204) adapted to perform several functions relating to, for example, respectively allocating subsets of the binary string of data to a plurality of frames.

The bit to symbol converting circuit/module 1224 may include circuitry and/or instructions (e.g., bit to symbol converting instructions 1232 stored on the storage medium 1204) adapted to perform several functions relating to, for example, determining a value of a sequence of data bits allocated to a frame, wherein the sequence of data bits is a subset of the binary string of data, and converting the value into a sequence of symbols associated with the frame.

The symbol transmitting circuit/module 1226 may include circuitry and/or instructions (e.g., symbol transmitting instructions 1234 stored on the storage medium 1204) adapted to perform several functions relating to, for example, transmitting the sequence of symbols to a receiver.

As mentioned above, instructions stored by the storage medium 1204, when executed by the processing circuit 1210, causes the processing circuit 1210 to perform one or more of the various functions and/or process operations described herein. For example, the storage medium 1204 may include one or more of the bit receiving instructions 1228 the data allocating instructions 1230, the bit to symbol converting instructions 1232, and the symbol transmitting instructions 1234.

FIG. 13 is a flowchart 1300 illustrating a method for encoding data on a serial bus interface coupled to a plurality of wires. The method may be performed by a device (e.g., bus master device 220 or bus slave circuit 202 of FIG. 2, device 300 or device 320 of FIG. 3, encoder 800 of FIG. 8, encoder 1000, apparatus 1200 of FIG. 12, and/or other devices described herein).

The device may receive a binary string of data to be encoded 1302. The device may then respectively allocate subsets of the binary string of data to a plurality of frames 1304. The device may further determine a value of a sequence of data bits allocated to a frame, wherein the sequence of data bits is a subset of the binary string of data 1306.

Thereafter, the device may convert the value into a sequence of symbols associated with the frame 1308. In an aspect of the disclosure, the device performs the conversion by first calculating base-N coefficients of a base-N number polynomial for the frame based on the value, where N is an integer greater than 2. Moreover, the calculated base-N coefficients respectively correspond to the sequence of symbols. Next, the device determines changes of states of the plurality of wires for each symbol of the sequence of symbols according to the base-2 coefficients respectively calculated for each symbol. In an aspect of the disclosure, a first wire of the plurality of wires may be a base wire such as a CLOCK carrier in traditional systems or a CLOCK line used in other types of systems. State changes on the first wire may be positioned on the most significant bit of a resultant symbol. As an example, the first wire may correspond to SCL described above. The device may then generate the sequence of symbols based on the changes of states of the plurality of wires for each symbol, and further transmit the sequence of symbols to a receiver 1310.

In an example implementation, the encoding method of FIG. 13 may be implemented using a base-N number polynomial, where N=3 (i.e., two physical wires), and two symbols per frame (although other values of N greater than 2 are contemplated, e.g., N=7 (i.e., three physical wires)). Accordingly, when N=3 (i.e., two physical wires), the device may convert the value into the sequence of symbols by calculating a first pair of base-2 coefficients of a first base-2 number polynomial according to a first base-N coefficient corresponding to a first symbol of the sequence of symbols and determining the changes of states of the plurality of wires for the first symbol according to the first pair of base-2 coefficients. The device may further calculate a second pair of base-2 coefficients of a second base-2 number polynomial according to a second base-N coefficient corresponding to a second symbol of the sequence of symbols and determine the changes of states for the second symbol according to the second pair of base-2 coefficients.

In accordance with certain aspects disclosed herein, each of the first pair and second pair of base-2 coefficients includes a first value and a second value. The first value indicates a chance in state or no chance in state between a current state of a first wire and a previous state of the first wire. The second value indicates a change in state or no change in state between a current state of a second wire and a previous state of the second wire. Moreover, the first value may represent an XNOR operation between the current state of the first wire and the previous state of the first wire and the second value may represent an XNOR operation between the current state of the second wire and the previous state of the second wire.

In accordance with certain aspects disclosed herein, when the first value is 0, a change in state between the current state of the first wire and the previous state of the first wire is indicated. When the first value is 1, no change in state between the current state of the first wire and the previous state of the first wire is indicated. When the second value is 0, a change in state between the current state of the second wire and the previous state of the second wire is indicated. When the second value is 1, no change in state between the current state of the second wire and the previous state of the second wire is indicated. In general, a change in the physical states of the wires indicates the presence of data information. The XNOR encoding scheme described herein may be applied to each wire of the two or more wires, wherein a value of "1" indicates no change in state and a value of "0" indicates a change in state.

In accordance with certain aspects disclosed herein, the device generates the sequence of symbols by determining that the first wire is to be pulled down to a LOW level when the change in state between the current state of the first wire and the previous state of the first wire is indicated for the first symbol. Moreover, the device pulls down the first wire to the LOW level when no change in state between the current state of the first wire and the previous state of the first wire is indicated for the second symbol. The device further refrains from pulling down the first wire to the LOW level when the change in state between the current state of the first wire and the previous state of the first wire is indicated for the second symbol.

Exemplary Device and Method for Decoding Data Based on Wire State Changes

Figure 14:
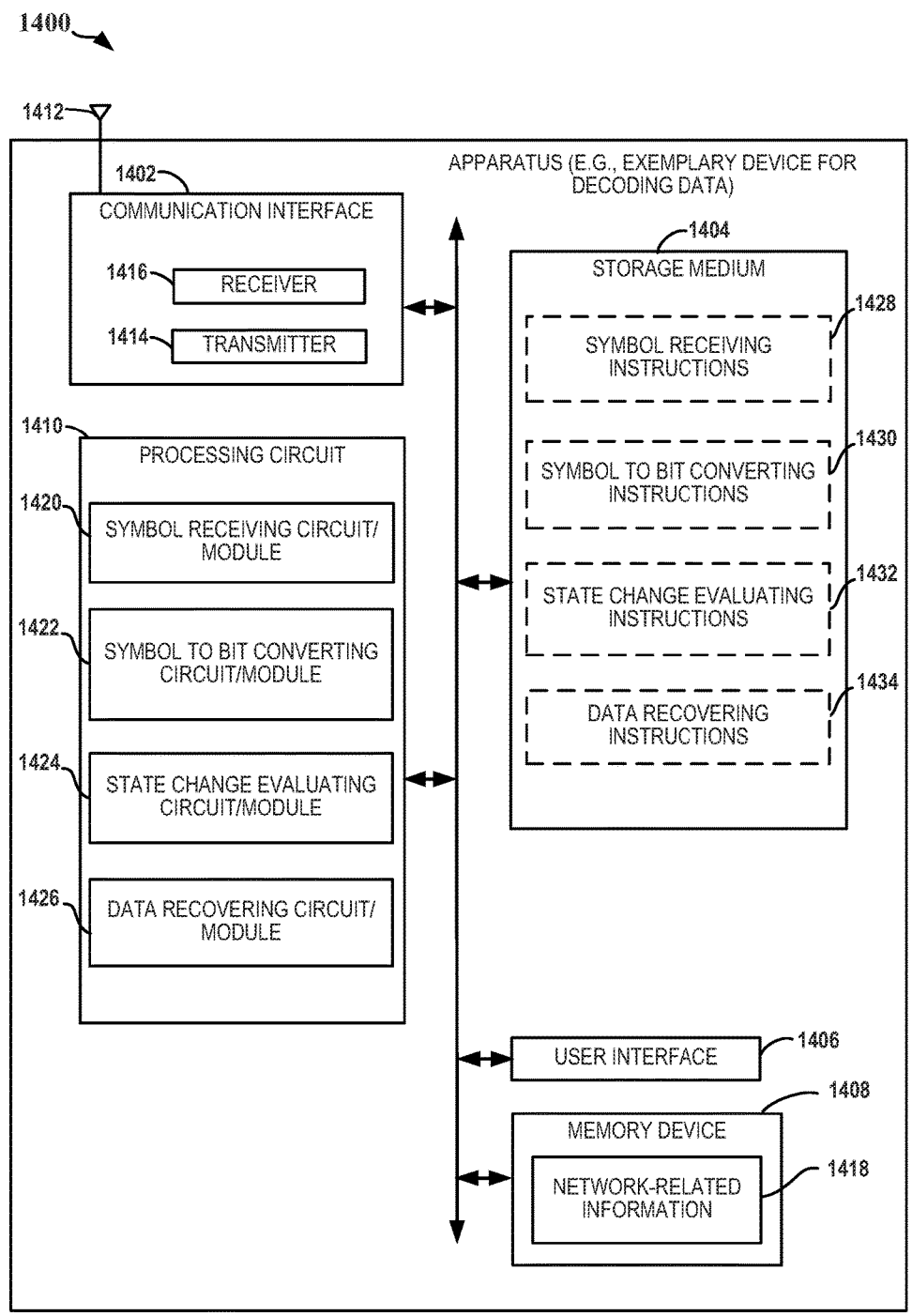
FIG. 14 is an illustration of an apparatus configured to support operations related to decoding data in a data communications interface according to one or more aspects of the disclosure.

FIG. 14 is an illustration of an apparatus 1400 configured to support operations related to decoding data in a data communications interface according to one or more aspects of the disclosure (e.g., aspects related to the method of FIG. 15 described below). The apparatus 1400 includes a communication interface (e.g., at least one transceiver) 1402, a storage medium 1404, a user interface 1406, a memory device 1408, and a processing circuit 1410.

These components can be coupled to and/or placed in electrical communication with one another via a signaling bus or other suitable component, represented generally by the connection lines in FIG. 14. The signaling bus may include any number of interconnecting buses and bridges depending on the specific application of the processing circuit 1410 and the overall design constraints. The signaling bus links together various circuits such that each of the communication interface 1402, the storage medium 1404, the user interface 1406, and the memory device 1408 are coupled to and/or in electrical communication with the processing circuit 1410. The signaling bus may also link various other circuits (not shown) such as timing sources, peripherals, voltage regulators, and power management circuits, which are well known in the art, and therefore, will not be described any further.

The communication interface 1402 may be adapted to facilitate wireless communication of the apparatus 1400. For example, the communication interface 1402 may include circuitry and/or code (e.g., instructions) adapted to facilitate the communication of information bi-directionally with respect to one or more communication devices in a network. The communication interface 1402 may be coupled to one or more antennas 1412 for wireless communication within a wireless communication system. The communication interface 1402 can be configured with one or more standalone receivers and/or transmitters, as well as one or more transceivers. In the illustrated example, the communication interface 1402 includes a transmitter 1414 and a receiver 1416.

The memory device 1408 may represent one or more memory devices. As indicated, the memory device 1408 may maintain network-related information 1418 along with other information used by the apparatus 1400. In some implementations, the memory device 1408 and the storage medium 1404 are implemented as a common memory component. The memory device 1408 may also be used for storing data that is manipulated by the processing circuit 1410 or some other component of the apparatus 1400.

The storage medium 1404 may represent one or more computer-readable, machine-readable, and/or processor-readable devices for storing code, such as processor executable code or instructions (e.g., software, firmware), electronic data, databases, or other digital information. The storage medium 1404 may also be used for storing data that is manipulated by the processing circuit 1410 when executing code. The storage medium 1404 may be any available media that can be accessed by a general purpose or special purpose processor, including portable or fixed storage devices, optical storage devices, and various other mediums capable of storing, containing or carrying code.

By way of example and not limitation, the storage medium 1404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1404 may be embodied in an article of manufacture (e.g., a computer program product). By way of example, a computer program product may include a computer-readable medium in packaging materials. In view of the above, in some implementations, the storage medium 1404 may be a non-transitory (e.g., tangible) storage medium.

The storage medium 1404 may be coupled to the processing circuit 1410 such that the processing circuit 1410 can read information from, and write information to, the storage medium 1404. That is, the storage medium 1404 can be coupled to the processing circuit 1410 so that the storage medium 1404 is at least accessible by the processing circuit 1410, including examples where at least one storage medium is integral to the processing circuit 1410 and/or examples where at least one storage medium is separate from the processing circuit 1410 (e.g., resident in the apparatus 1400, external to the apparatus 1400, distributed across multiple entities, etc.).

Code and/or instructions stored by the storage medium 1404, when executed by the processing circuit 1410, causes the processing circuit 1410 to perform one or more of the various functions and/or process operations described herein. For example, the storage medium 1404 may include operations configured for regulating operations at one or more hardware blocks of the processing circuit 1410, as well as to utilize the communication interface 1402 for wireless communication utilizing their respective communication protocols.

The processing circuit 1410 is generally adapted for processing, including the execution of such code/instructions stored on the storage medium 1404. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1410 is arranged to obtain, process and/or send data, control data access and storage, issue commands, and control other desired operations. The processing circuit 1410 may include circuitry configured to implement desired code provided by appropriate media in at least one example. For example, the processing circuit 1410 may be implemented as one or more processors, one or more controllers, and/or other structure configured to execute executable code. Examples of the processing circuit 1410 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1410 are for illustration and other suitable configurations within the scope of the disclosure are also contemplated.

According to one or more aspects of the disclosure, the processing circuit 1410 may be adapted to perform any or all of the features, processes, functions, operations and/or routines for any or all of the apparatuses described herein. As used herein, the term "adapted" in relation to the processing circuit 1410 may refer to the processing circuit 1410 being one or more of configured, employed, implemented, and/or programmed to perform a particular process, function, operation and/or routine according to various features described herein.

Figure 15:
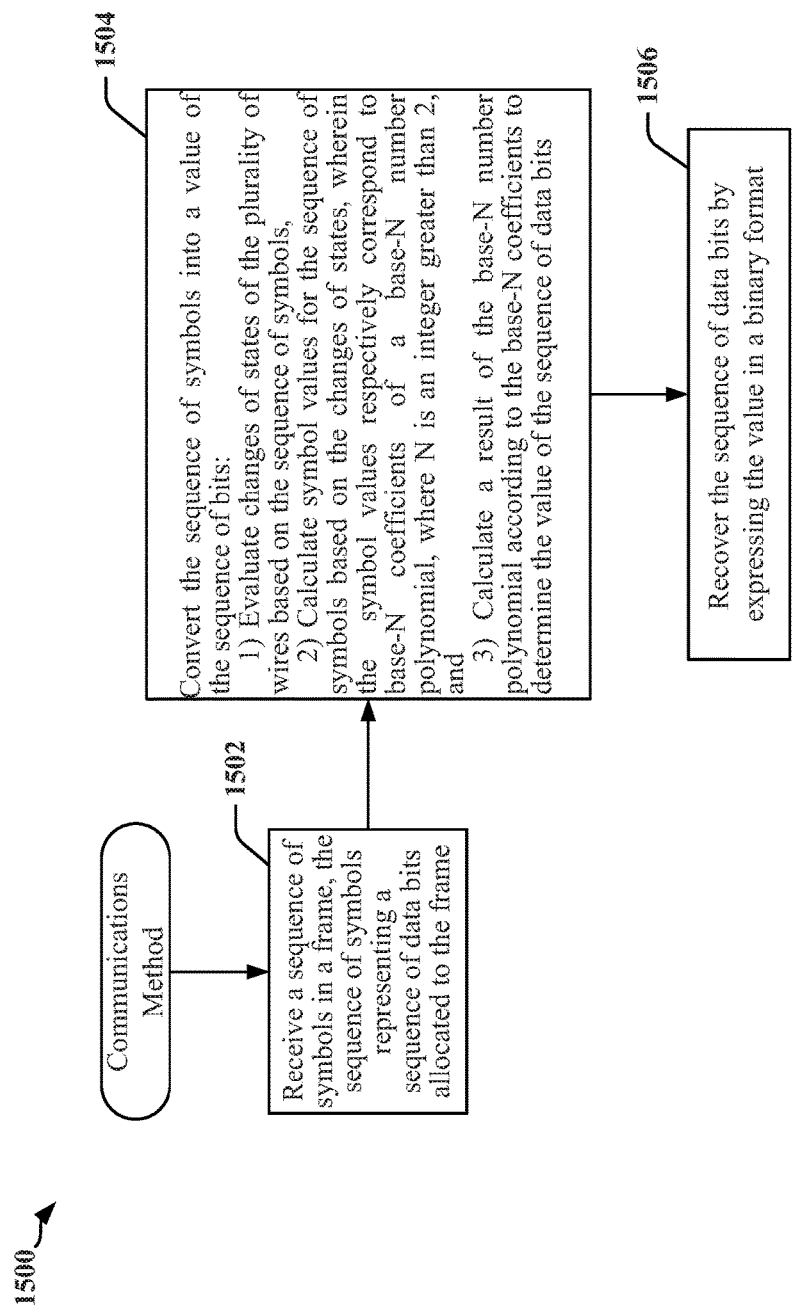
FIG. 15 is a flowchart illustrating another method for data communications on a serial bus interface according to one or more aspects disclosed herein.

According to at least one example of the apparatus 1400, the processing circuit 1410 may include one or more of a symbol receiving circuit/module 1420, a symbol to bit converting circuit/module 1422, a state change evaluating circuit/module 1424, and a data recovering circuit/module 1426, that are adapted to perform any or all of the features, processes, functions, operations and/or routines described herein (e.g., features, processes, functions, operations and/or routines described with respect to FIG. 15).

The symbol receiving circuit/module 1420 may include circuitry and/or instructions (e.g., symbol receiving instructions 1428 stored on the storage medium 1404) adapted to perform several functions relating to, for example, receiving a sequence of symbols in a frame, the sequence of symbols representing a sequence of data bits allocated to the frame.

The symbol to bit converting circuit/module 1422 may include circuitry and/or instructions (e.g., symbol to bit converting instructions 1430 stored on the storage medium 1404) adapted to perform several functions relating to, for example, converting the sequence of symbols into a value of the sequence of data bits.

The state change evaluating circuit/module 1424 may include circuitry and/or instructions (e.g., state change evaluating instructions 1432 stored on the storage medium 1404) adapted to perform several functions relating to, for example, evaluating changes of states of a plurality of wires based on the sequence of symbols.

The data recovering circuit/module 1426 may include circuitry and/or instructions (e.g., data recovering instructions 1434 stored on the storage medium 1404) adapted to perform several functions relating to, for example, recovering the sequence of data bits by expressing the value in a binary format.

As mentioned above, instructions stored by the storage medium 1404, when executed by the processing circuit 1410, causes the processing circuit 1410 to perform one or more of the various functions and/or process operations described herein. For example, the storage medium 1404 may include one or more of the symbol receiving instructions 1428, the symbol to bit converting instructions 1430, the state change evaluating instructions 1432, and the data recovering instructions 1434.

FIG. 15 is a flowchart 1500 illustrating a method for encoding data communications on a serial bus interface coupled to a plurality of wires. The method may be performed by a device (e.g., bus master device 220 or bus slave circuit 202 of FIG. 2, device 300 or device 320 of FIG. 3, decoder 820 of FIG. 8, decoder 1020, apparatus 1400 of FIG. 14, and/or other devices described herein).

The device may receive a sequence of symbols in a frame 1502. The sequence of symbols may represent a sequence of data bits allocated to the frame. In an aspect of the disclosure, the sequence of data bits is a subset of a binary string of data to be decoded, wherein subsets of the binary string are respectively allocated to a plurality of frames.

The device may convert the sequence of symbols into a value of the sequence of data bits 1504. In accordance with certain aspects disclosed herein, the device may convert the sequence of symbols into the value by first evaluating changes of states of the plurality of wires based on the sequence of symbols. Next, the device calculates symbol values for the sequence of symbols based on the changes of states. The symbol values may respectively correspond to base-N coefficients of a base-N number polynomial, where N is an integer greater than 2. Thereafter, the device calculates a result of the base-N number polynomial according to the base-N coefficients to determine the value of the sequence of data bits. The device then recovers the sequence of data bits by expressing the value in a binary format 1506.

Each symbol of the sequence of symbols includes current states of the plurality of wires. In an example implementation, the decoding method of FIG. 15 may be implemented using a base-N number polynomial, where N=3 (i.e., two physical wires), and using two symbols per frame (although other values of N greater than 2 are contemplated, e.g., N=7 (i.e., three physical wires)). Accordingly, when N=3 (i.e., two physical wires), the device may evaluate the changes of states of the plurality of wires by performing, for each symbol, an exclusive-NOR (XNOR) operation between a current state of a first wire and a previous state of the first wire to determine a first state value, and an exclusive-NOR (XNOR) operation between a current state of a second wire and a previous state of the second wire to determine a second state value.

In accordance with certain aspects disclosed herein, the device determines that the first state value is 0 when a change in state occurs between the current state of the first wire and the previous state of the first wire, the device determines that the first state value is 1 when no change in state occurs between the current state of the first wire and the previous state of the first wire, the device determines that the second state value is 0 when a chance in state occurs between the current state of the second wire and the previous state of the second wire, and the device determines that the second state value is 1 when no change in state occurs between the current state of the second wire and the previous state of the second wire.

In accordance with certain aspects disclosed herein, the first state value and the second state value of a symbol correspond to a pair of base-2 coefficients of a base-2 number polynomial corresponding to the symbol. Accordingly, the device calculates the symbol values of the sequence of symbols by calculating a result of the base-2 number polynomial of each symbol of the sequence of symbols according to a respective pair of base-2 coefficients corresponding to each symbol, and determining a symbol value for each symbol according to the result of the base-2 number polynomial respectively calculated for each symbol.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A: X employs B: or X employs both A and B. In addition, the articles "a" and "an" as used in this application and the appended claims should generally be construed to mean "one or more" unless specified otherwise or clear from the context to be directed to a singular form.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for encoding data in a data communications interface, comprising:
    a communication interface circuit coupled to a plurality of wires; and
    a processing circuit coupled to the communication interface circuit and configured to:
    determine a value of a sequence of data bits allocated to a frame,
    convert the value into a sequence of symbols associated with the frame, wherein the processing circuit configured to convert is configured to:
        calculate base-N coefficients of a base-N number polynomial for the frame based on the value, where N is an integer greater than 2, and where the base-N coefficients respectively correspond to symbols of the sequence of symbols,
        calculate base-2 coefficients of a base-2 number polynomial for each symbol of the sequence of symbols according to a respective base-N coefficient corresponding to each symbol,
        determine changes of states of the plurality of wires for each symbol of the sequence of symbols according to the base-2 coefficients respectively calculated for each symbol, and
        generate the sequence of symbols based on the changes of states of the plurality of wires for each symbol, and
    transmit the sequence of symbols to a receiver.

2. The apparatus of claim 1, wherein the processing circuit is further configured to:
    receive a binary string of data to be encoded; and
    respectively allocate subsets of the binary string of data to a plurality of frames, wherein the sequence of data bits is a subset of the binary string of data.

3. The apparatus of claim 1, wherein the processing circuit configured to convert the value into the sequence of symbols is further configured to:

calculate a first pair of base-2 coefficients of a first base-2 number polynomial according to a first base-N coefficient corresponding to a first symbol of the sequence of symbols;
determine the changes of states of the plurality of wires for the first symbol according to the first pair of base-2 coefficients;
calculate a second pair of base-2 coefficients of a second base-2 number polynomial according to a second base-N coefficient corresponding to a second symbol of the sequence of symbols; and
determine the changes of states of the plurality of wires for the second symbol according to the second pair of base-2 coefficients.

4. The apparatus of claim 3, wherein:
each of the first pair and second pair of base-2 coefficients includes a first value and a second value;
the first value indicates a change in state or no change in state between a current state of a first wire and a previous state of the first wire; and
the second value indicates a change in state or no change in state between a current state of a second wire and a previous state of the second wire.

5. The apparatus of claim 4, wherein:
the first value represents an exclusive-NOR (XNOR) operation between the current state of the first wire and the previous state of the first wire; and
the second value represents an exclusive-NOR (XNOR) operation between the current state of the second wire and the previous state of the second wire.

6. The apparatus of claim 4, wherein:
when the first value is 0, a change in state between the current state of the first wire and the previous state of the first wire is indicated,
when the first value is 1, no change in state between the current state of the first wire and the previous state of the first wire is indicated,
when the second value is 0, a change in state between the current state of the second wire and the previous state of the second wire is indicated, and
when the second value is 1, no change in state between the current state of the second wire and the previous state of the second wire is indicated.

7. The apparatus of claim 6, wherein the processing circuit configured to generate the sequence of symbols is configured to:
determine that the first wire is to be pulled down to a LOW level when the change in state between the current state of the first wire and the previous state of the first wire is indicated for the first symbol.

8. The apparatus of claim 7, wherein the processing circuit configured to generate the sequence of symbols is further configured to:
pull down the first wire to the LOW level when no change in state between the current state of the first wire and the previous state of the first wire is indicated for the second symbol; and
refrain from pulling down the first wire to the LOW level when the change in state between the current state of the first wire and the previous state of the first wire is indicated for the second symbol.

9. A method of encoding data in a data communications interface coupled to a plurality of wires, comprising:
determining a value of a sequence of data bits allocated to a frame;
converting the value into a sequence of symbols associated with the frame, wherein the converting includes:
calculating base-N coefficients of a base-N number polynomial for the frame based on the value, where N is an integer greater than 2, and where the base-N coefficients respectively correspond to symbols of the sequence of symbols,
calculating base-2 coefficients of a base-2 number polynomial for each symbol of the sequence of symbols according to a respective base-N coefficient corresponding to each symbol,
determining changes of states of the plurality of wires for each symbol of the sequence of symbols according to the base-2 coefficients respectively calculated for each symbol,
generating the sequence of symbols based on the changes of states of the plurality of wires for each symbol; and
transmitting the sequence of symbols to a receiver.

10. The method of claim 9, further including:
receiving a binary string of data to be encoded; and
respectively allocating subsets of the binary string of data to a plurality of frames, wherein the sequence of data bits is a subset of the binary string of data.

11. The method of claim 9, wherein the converting the value into the sequence of symbols includes:
calculating a first pair of base-2 coefficients of a first base-2 number polynomial according to a first base-N coefficient corresponding to a first symbol of the sequence of symbols;
determining the changes of states of the plurality of wires for the first symbol according to the first pair of base-2 coefficients;
calculating a second pair of base-2 coefficients of a second base-2 number polynomial according to a second base-N coefficient corresponding to a second symbol of the sequence of symbols; and
determining the changes of states of the plurality of wires for the second symbol according to the second pair of base-2 coefficients.

12. The method of claim 11, wherein:
each of the first pair and second pair of base-2 coefficients includes a first value and a second value;
the first value indicates a change in state or no change in state between a current state of a first wire and a previous state of the first wire; and
the second value indicates a change in state or no change in state between a current state of a second wire and a previous state of the second wire.

13. The apparatus of claim 12, wherein:
the first value represents an exclusive-NOR (XNOR) operation between the current state of the first wire and the previous state of the first wire; and
the second value represents an exclusive-NOR (XNOR) operation between the current state of the second wire and the previous state of the second wire.

14. The method of claim 12, wherein:
when the first value is 0, a change in state between the current state of the first wire and the previous state of the first wire is indicated,
when the first value is 1, no change in state between the current state of the first wire and the previous state of the first wire is indicated,
when the second value is 0, a change in state between the current state of the second wire and the previous state of the second wire is indicated, and
when the second value is 1, no change in state between the current state of the second wire and the previous state of the second wire is indicated.

15. The method of claim 14, wherein the generating the sequence of symbols includes:
determining that the first wire is to be pulled down to a LOW level when the change in state between the current state of the first wire and the previous state of the first wire is indicated for the first symbol.

16. The method of claim 15, wherein the generating the sequence of symbols further includes:
pulling down the first wire to the LOW level when no change in state between the current state of the first wire and the previous state of the first wire is indicated for the second symbol; and
refraining from pulling down the first wire to the LOW level when the change in state between the current state of the first wire and the previous state of the first wire is indicated for the second symbol.

17. An apparatus for encoding data in a data communications interface coupled to a plurality of wires, comprising:
means for determining a value of a sequence of data bits allocated to a frame;
means for converting the value into a sequence of symbols associated with the frame, wherein the means for converting is configured to:
calculate base-N coefficients of a base-N number polynomial for the frame based on the value, where N is an integer greater than 2, and where the base-N coefficients respectively correspond to symbols of the sequence of symbols,
calculate base-2 coefficients of a base-2 number polynomial for each symbol of the sequence of symbols according to a respective base-N coefficient corresponding to each symbol, and
determine changes of states of the plurality of wires for each symbol of the sequence of symbols according to the base-2 coefficients respectively calculated for each symbol,
generate the sequence of symbols based on the changes of states of the plurality of wires for each symbol; and
means for transmitting the sequence of symbols to a receiver.

18. The apparatus of claim 17, further including:
means for receiving a binary string of data to be encoded; and
means for respectively allocating subsets of the binary string of data to a plurality of frames, wherein the sequence of data bits is a subset of the binary string of data.

19. The apparatus of claim 17, wherein the means for converting the value into the sequence of symbols is configured to:
calculate a first pair of base-2 coefficients of a first base-2 number polynomial according to a first base-N coefficient corresponding to a first symbol of the sequence of symbols;
determine the changes of states of the plurality of wires for the first symbol according to the first pair of base-2 coefficients;
calculate a second pair of base-2 coefficients of a second base-2 number polynomial according to a second base-N coefficient corresponding to a second symbols of the sequence of symbols; and
determine the changes of states of the plurality of wires for the second symbol according to the second pair of base-2 coefficients.

20. The apparatus of claim 19, wherein:
each of the first pair and second pair of base-2 coefficients includes a first value and a second value;
the first value indicates a change in state or no change in state between a current state of a first wire and a previous state of the first wire; and
the second value indicates a change in state or no change in state between a current state of a second wire and a previous state of the second wire.

21. The apparatus of claim 20, wherein:
the first value represents an XNOR operation between the current state of the first wire and the previous state of the first wire; and
the second value represents an XNOR operation between the current state of the second wire and the previous state of the second wire.

22. The apparatus of claim 20, wherein:
when the first value is 0, a change in state between the current state of the first wire and the previous state of the first wire is indicated,
when the first value is 1, no change in state between the current state of the first wire and the previous state of the first wire is indicated,
when the second value is 0, a change in state between the current state of the second wire and the previous state of the second wire is indicated, and
when the second value is 1, no change in state between the current state of the second wire and the previous state of the second wire is indicated.

23. The apparatus of claim 22, wherein the means for converting configured to generate the sequence of symbols is configured to:
determine that the first wire is to be pulled down to a LOW level when the change in state between the current state of the first wire and the previous state of the first wire is indicated for the first symbol.

24. The apparatus of claim 23, wherein the means for converting configured to generate the sequence of symbols is further configured to:
pull down the first wire to the LOW level when no change in state between the current state of the first wire and the previous state of the first wire is indicated for the second symbol; and
refrain from pulling down the first wire to the LOW level when the change in state between the current state of the first wire and the previous state of the first wire is indicated for the second symbol.

25. An apparatus for decoding data in a data communications interface, comprising:
a communication interface circuit coupled to a plurality of wires; and
a processing circuit coupled to the communication interface circuit and configured to:
receive a sequence of symbols in a frame, the sequence of symbols representing a sequence of data bits allocated to the frame,
convert the sequence of symbols into a value of the sequence of data bits, wherein the processing circuit configured to convert is configured to:
evaluate changes of states of the plurality of wires based on the sequence of symbols,
calculate symbol values for the sequence of symbols based on the changes of states, wherein the symbol values respectively correspond to base-N coefficients of a base-N number polynomial, where N is an integer greater than 2, and calculate a result of the base-N number polynomial according to the base-N coefficients to determine the value of the sequence of data bits, and recover the sequence of data bits by expressing the value in a binary format.

26. The apparatus of claim 25, wherein the sequence of data bits is a subset of a binary string of data to be decoded, and wherein subsets of the binary string are respectively allocated to a plurality of frames.

27. The apparatus of claim 25, wherein each symbol of the sequence of symbols includes current states of the plurality of wires, and wherein the processing circuit configured to evaluate the changes of states of the plurality of wires is configured to perform for each symbol:

an exclusive-NOR (XNOR) operation between a current state of a first wire and a previous state of the first wire to determine a first state value; and an exclusive-NOR (XNOR) operation between a current state of a second wire and a previous state of the second wire to determine a second state value.

28. The apparatus of claim 27, wherein the processing circuit configured to evaluate the changes of states of the plurality of wires is further configured to:

determine that the first state value is 0 when a change in state occurs between the current state of the first wire and the previous state of the first wire;

determine that the first state value is 1 when no change in state occurs between the current state of the first wire and the previous state of the first wire;

determine that the second state value is 0 when a change in state occurs between the current state of the second wire and the previous state of the second wire; and determine that the second state value is 1 when no change in state occurs between the current state of the second wire and the previous state of the second wire.

29. The apparatus of claim 27, wherein the first state value and the second state value of a symbol correspond to a pair of base-2 coefficients of a base-2 number polynomial corresponding to the symbol.

30. The apparatus of claim 29, wherein the processing circuit configured to calculate the symbol values of the sequence of symbols is configured to:

calculate a result of the base-2 number polynomial of each symbol of the sequence of symbols according to a respective pair of base-2 coefficients corresponding to each symbol; and determine a symbol value for each symbol according to the result of the base-2 number polynomial respectively calculated for each symbol.

* * * * *